(12) United States Patent
Wang et al.

(10) Patent No.: US 10,069,547 B2
(45) Date of Patent: Sep. 4, 2018

(54) BEAMFORMING BASED COMMUNICATIONS METHOD AND APPARATUS

(71) Applicant: Huawei Technologies Co., Ltd., Shenzhen (CN)

(72) Inventors: Guangjian Wang, Chengdu (CN); Miaomiao Zhang, Shenzhen (CN); Jingjing Cheng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 15/234,830

(22) Filed: Aug. 11, 2016

(65) Prior Publication Data

US 2016/0353294 A1 Dec. 1, 2016

Related U.S. Application Data

(63) Continuation of application No. PCT/CN2014/074672, filed on Apr. 2, 2014.

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0465* (2013.01); *H04B 7/0617* (2013.01);
(Continued)

(58) Field of Classification Search
CPC .................................................. H04B 7/0456
See application file for complete search history.

(56) References Cited

U.S. PATENT DOCUMENTS

| | | |
|---|---|---|
| 5,579,016 A | 11/1996 | Wolcott et al. |
| 7,339,979 B1 | 3/2008 | Kelkar |

(Continued)

FOREIGN PATENT DOCUMENTS

| | | |
|---|---|---|
| CN | 101162930 A | 4/2008 |
| CN | 101227217 A | 7/2008 |

(Continued)

OTHER PUBLICATIONS

Hur, Sooyoung et al.; "Milimeter Wave Beamforming for Wireless Backhaul and Access in Small Cell Networks"; School of Electrical and Computer Engineering, Purdue University, West Lafayette, IN; Department of Electronic Engineering, City University of Hong Kong, Kowloon, Hong Kong; Nokia Siemens Networks, Arlington Heights, IL; arXiv:1306.6659v1 [cs.IT]; Jun. 27, 2013 34 pages.

*Primary Examiner* — Jason E Mattis
(74) *Attorney, Agent, or Firm* — Slater Matsil, LLP

(57) ABSTRACT

Embodiments of the present application provide a beamforming based communications method and apparatus. The method includes: obtaining, by a transmit end, a transmit-end precoding matrix TrBB, a transmit-end intermediate-frequency beamforming matrix TrIF, and a transmit-end radio-frequency-end beamforming matrix TrRF according to feedback information that is from a receive end; acquiring a first data stream, and performing precoding processing on the first data stream according to TrBB, to generate a first analog signal; performing weighting and power amplification processing on the first analog signal according to TrIF, to generate a second analog signal; performing weighting and power amplification processing on the second analog signal according to TrRF, to generate a third analog signal; and determining an antenna array matching the third analog signal, and transmitting the third analog signal to the receive (Continued)

end by using the antenna array matching the third analog signal.

24 Claims, 11 Drawing Sheets

(51) Int. Cl.
*H04L 5/04* (2006.01)
*H04L 5/12* (2006.01)
*H04W 24/02* (2009.01)
*H04B 7/08* (2006.01)

(52) U.S. Cl.
CPC ............... *H04B 7/086* (2013.01); *H04L 5/04* (2013.01); *H04L 5/12* (2013.01); *H04W 24/02* (2013.01)

(56) References Cited

U.S. PATENT DOCUMENTS

| | | | |
|---|---|---|---|
| 8,111,679 | B2 | 2/2012 | Tsutsui |
| 8,842,640 | B2 | 9/2014 | Jeon et al. |
| 2007/0037528 | A1 | 2/2007 | Doan et al. |
| 2007/0263748 | A1* | 11/2007 | Mesecher .............. H01Q 1/282 375/299 |
| 2008/0049709 | A1 | 2/2008 | Pan et al. |
| 2012/0086602 | A1* | 4/2012 | Park .......................... G01S 3/48 342/372 |
| 2013/0028341 | A1 | 1/2013 | Ayach et al. |
| 2013/0039445 | A1 | 2/2013 | Hwang |
| 2013/0202045 | A1 | 8/2013 | Jeon et al. |
| 2013/0202054 | A1 | 8/2013 | Khan et al. |
| 2013/0301454 | A1 | 11/2013 | Seol et al. |
| 2014/0079098 | A1* | 3/2014 | Harjani .................. H04B 1/001 375/219 |
| 2014/0354499 | A1* | 12/2014 | Legay .................. H01Q 3/2664 343/778 |
| 2015/0124688 | A1* | 5/2015 | Xu ....................... H04B 7/0452 370/312 |
| 2016/0080051 | A1* | 3/2016 | Sajadieh ............. H04B 7/0456 375/267 |

FOREIGN PATENT DOCUMENTS

| | | |
|---|---|---|
| CN | 101383649 A | 3/2009 |
| CN | 101512929 A | 8/2009 |
| CN | 101719816 A | 6/2010 |
| CN | 101834650 A | 9/2010 |
| CN | 102204115 A | 9/2011 |
| CN | 103428148 A | 12/2013 |
| JP | H09130128 A | 5/1997 |
| JP | 2009505507 A | 2/2009 |

* cited by examiner

BEAMFORMING BASED COMMUNICATIONS METHOD AND APPARATUS

CROSS-REFERENCE TO RELATED APPLICATIONS

This application is a continuation of International Application No. PCT/CN2014/074672, filed on Apr. 2, 2014, which is hereby incorporated by reference in its entirety.

TECHNICAL FIELD

The present application relates to the communications field, and in particular, to a beamforming based communications method and apparatus.

BACKGROUND

With the development of science and technologies as well as the society, quantities of mobile and wireless services sharply increase. In the prior art, it is very difficult to fulfill such a requirement by improving spectral efficiency, and it becomes an inevitable trend to use a high frequency band. To meet a future requirement for a high-speed increase of a mobile data rate, a millimetric-wave band has attracted attention of a larger quantity of people because of characteristics such as a short wavelength and a wide band of the millimetric-wave band. However, compared with existing microwave communication, a millimetric wave is more susceptible to rain, air, and the like and is therefore absorbed by the atmosphere, causing a problem such as an increase in a transmission loss. To minimize a transmission loss, using a phased array antenna system having a large array to improve a transmission gain to further improve precision of a beam direction already becomes a problem to be urgently resolved in the industry.

A large-array beamforming technology needs to be used in a phased array antenna system having a large array. At present, schemes of implementing the large-array beamforming technology may be basically classified into three types: a beamforming scheme based on digital precoding, a beamforming scheme based on phase shifters, and a hybrid beamforming scheme based on a digital and analog two-level-controller. However, the beamforming scheme based on digital precoding requires a very large quantity of radio-frequency link analog to digital converters (ADCs)/digital to analog converters (DACs), causing relatively high costs and power consumption in hardware implementation; the beamforming scheme based on analog phase shifters causes flexibility of beam control to be reduced; for the hybrid beamforming scheme based on a digital and analog two-level-controller, a particular deviation in accuracy of a beam direction exists in the scheme. Therefore, how to efficiently perform beamforming communication when costs are properly controlled already becomes a problem to be urgently resolved in the industry.

SUMMARY

Embodiments of the present application provide a beamforming based communications method and apparatus, which simultaneously control a beam direction and a beam width by using a three-level structure, so that not only a quantity of analog to digital converters (ADCs)/digital to analog converters (DACs) required for beam control is reduced, but also adjustment of a gain can be implemented by adjusting quantities of intermediate-frequency ports and radio-frequency ports.

To achieve the foregoing objectives, the following technical solutions are used in the embodiments of the present application.

According to a first aspect, an embodiment of the present application provides a transmit end, where the transmit end includes a processor and a non-transitory computer readable storage medium storing programming for execution by the processor. The programming includes instructions to obtain, by the transmit end, a transmit-end precoding matrix $Tr_{BB}$, a transmit-end intermediate-frequency beamforming matrix $Tr_{IF}$, and a transmit-end radio-frequency-end beamforming matrix $Tr_{RF}$ according to feedback information that is from a receive end, where the feedback information includes a channel matrix H and AOD vector information. The instructions also include instructions to acquire, by the transmit end, a first data stream, and perform precoding processing on the first data stream according to $Tr_{BB}$, to generate a first analog signal, where the first data stream is generated after a bitstream to be sent is scrambled and undergoes layer mapping. Additionally, the instructions include instructions to perform, by the transmit end, weighting and power amplification processing on the first analog signal according to $Tr_{IF}$, to generate a second analog signal and to perform, by the transmit end, weighting and power amplification processing on the second analog signal according to $Tr_{RF}$, to generate a third analog signal. Also, the instructions include instructions to determine, by the transmit end, an antenna array matching the third analog signal, and transmit the third analog signal to the receive end by using the antenna array matching the third analog signal.

In a first possible implementation manner of the first aspect, the processor is configured to: perform, by the transmit end, precoding on the first data stream according to $Tr_{BB}$, to obtain a precoding signal; and perform, digital-to-analog conversion processing on the precoding signal, to generate the first analog signal.

With reference to the first aspect or the first possible implementation manner of the first aspect, in a second possible implementation manner of the first aspect, the processor is configured to perform intermediate-frequency-end up-conversion processing on the first analog signal; perform according to $Tr_{IF}$, weighting processing on the first analog signal that has undergone up-conversion; and perform power amplification processing on the first analog signal that has undergone weighting processing, to generate the second analog signal.

With reference to the first aspect or the first or second possible implementation manner of the first aspect, in a third possible implementation manner of the first aspect, the processor is configured to perform radio-frequency-end up-conversion processing on the second analog signal; perform according to $Tr_{RF}$, weighting processing on the second analog signal that has undergone up-conversion; and perform power amplification processing on the second analog signal that has undergone weighting processing, to generate the third analog signal.

With reference to the first aspect or any one of the first to third possible implementation manners of the first aspect, in a fourth possible implementation manner of the first aspect, the processor is configured to perform according to $Tr_{IF}$, weighting processing on the first analog signal that has undergone up-conversion, where a manner of the weighting processing is any one of amplitude weighting and phase weighting, amplitude weighting, and phase weighting.

With reference to the first aspect or any one of the first to fourth possible implementation manners of the first aspect, in a fifth possible implementation manner of the first aspect, the processor is configured to acquire the channel matrix H and the angle-of-departure vector information according to the feedback information; and process the channel matrix H and the angle-of-departure vector information by using a first preset iteration function, to obtain $Tr_{BB}$, $Tr_{IF}$, and $Tr_{RF}$.

According to a second aspect, an embodiment of the present application provides a receive end, where the receive end includes a processor and a non-transitory computer readable storage medium storing programming for execution by the processor. The programming includes instructions to obtain, by the receive end through calculation, a receive-end precoding matrix $Rx_{BB}$, a receive-end intermediate-frequency beamforming matrix $Rx_{IF}$, and a receive-end radio-frequency-end beamforming matrix $Rx_{RF}$ according to feedback information that is from a transmit end, where the feedback information includes a channel matrix H, angle-of-arrival (AOA) vector information, a transmit-end precoding matrix $Tr_{BB}$, a transmit-end intermediate-frequency beamforming matrix $Tr_{IF}$, and a transmit-end radio-frequency-end beamforming matrix $Tr_{RF}$. The instructions also include instructions to acquire, by the receive end, a first analog signal, and perform weighting and power amplification processing on the first analog signal according to $Rx_{RF}$, to generate a second analog signal. Additionally, the instructions include instructions to perform, by the receive end, weighting and power amplification processing on the second analog signal according to $Rx_{IF}$, to generate a third analog signal and perform, by the receive end, encoding processing on the third analog signal according to $Rx_{BB}$, to generate a second data stream, where the second data stream is used to perform layer demapping.

In a first possible implementation manner of the second aspect, the processor is configured to perform weighting processing on the fourth analog signal according to $Rx_{RF}$; perform power amplification processing on the fourth analog signal that has undergone weighting processing; and perform radio-frequency-end down-conversion processing on the fourth analog signal that has undergone power amplification processing, to generate the fifth analog signal.

With reference to the second aspect or the first possible implementation manner of the second aspect, in a second possible implementation manner of the second aspect, the processor is configured to perform weighting processing on the fifth analog signal according to $Rx_{IF}$; perform power amplification processing on the fifth analog signal that has undergone weighting processing; and perform intermediate-frequency-end down-conversion processing on the fifth analog signal that has undergone power amplification processing, to generate the sixth analog signal.

With reference to the second aspect or the first or second possible implementation manner of the second aspect, in a third possible implementation manner of the second aspect, the processor is configured to convert the sixth analog signal into a digital signal; and perform according to $Rx_{BB}$, weighting processing on the sixth analog signal converted into the digital signal, to obtain the second data stream.

With reference to the second aspect or any one of the first to third possible implementation manners of the second aspect, in a fourth possible implementation manner of the second aspect, the processor is configured to perform weighting processing on the fifth analog signal according to $Rx_{IF}$, where a manner of the weighting processing is any one of amplitude weighting and phase weighting, amplitude weighting, and phase weighting.

With reference to the second aspect or any one of the first to fourth possible implementation manners of the second aspect, in a fifth possible implementation manner of the second aspect, the processor is configured to acquire the channel matrix H, the angle-of-arrival vector information, $Tr_{BB}$, $Tr_{IF}$, and $Tr_{RF}$ that are in the feedback information; and process the channel matrix H, the angle-of-arrival vector information, $Tr_{BB}$, $Tr_{IF}$, and $Tr_{RF}$ by using a second preset iteration function, to obtain $Rx_{BB}$, $Rx_{IF}$, and $Rx_{RF}$.

According to a third aspect, an embodiment of the present application provides a transmit end, where the transmit end includes a first processor, a second processor, a first transceiver, a second transceiver, a DAC converter, a first frequency mixer, a second frequency mixer, a first phase shifter, a second phase shifter, a first power amplifier, and a second power amplifier, where the first transceiver is connected to the first processor, and the first processor is connected to the DAC converter to form a transmit-end precoding processing branch, where the first transceiver is configured to receive the first data stream and send the first data stream to the first processor; the first processor is configured to multiply the first data stream by $Tr_{BB}$; the DAC converter performs digital-to-analog conversion processing on the first data stream that is obtained after being multiplied by $Tr_{BB}$, to generate the first analog signal, where the first data stream is generated after a bitstream to be sent is scrambled and undergoes layer mapping; the first frequency mixer is connected to the first phase shifter, and the first phase shifter is connected to the first power amplifier to form a transmit-end intermediate-frequency processing branch, where the first frequency mixer is configured to perform, by the transmit end, intermediate-frequency up-conversion processing on the first analog signal; the first phase shifter is configured to perform, according to $Tr_{IF}$, weighting processing on the first analog signal that has undergone up-conversion; and the first power amplifier is configured to perform power amplification processing on the first analog signal that has undergone weighting processing, to generate the second analog signal; the second frequency mixer is connected to the second phase shifter, and the second phase shifter is connected to the second power amplifier to form a transmit-end radio-frequency processing branch, where the second frequency mixer is configured to perform radio-frequency up-conversion processing on the second analog signal; the second phase shifter is configured to perform, according to $Tr_{RF}$, weighting processing on the second analog signal that has undergone up-conversion; and the second power amplifier is configured to perform power amplification processing on the second analog signal that has undergone weighting processing, to generate the third analog signal; and the second transceiver is connected to the second processor to form a transmit-end feedback branch, where the second transceiver is configured to acquire a channel matrix H according to the feedback information; the second processor is configured to calculate the angle-of-departure vector information according to the channel matrix H and the feedback information, and process the channel matrix H and the angle-of-departure vector information by using a first preset iteration function, to obtain $Tr_{BB}$, $Tr_{IF}$, and $Tr_{RF}$.

In a first possible implementation manner of the third aspect, the first phase shifter is specifically configured to perform any one of amplitude weighting and phase weighting, amplitude weighting, and phase weighting on the second analog signal that has undergone up-conversion.

According to a fourth aspect, an embodiment of the present application provides a receive end, where the receive end includes a first phase shifter, a second phase shifter, a first power amplifier, a second power amplifier, a first frequency mixer, a second frequency mixer, a DAC converter, a first processor, a second processor, and a first transceiver, where the first phase shifter is connected to the first power amplifier, and the first power amplifier is connected to the first frequency mixer to form a receive-end radio-frequency processing branch, where the first phase shifter is configured to perform weighting processing on the first analog signal according to $Rx_{RF}$; the first power amplifier is configured to perform power amplification processing on the first analog signal that has undergone weighting processing; and the first frequency mixer is configured to perform radio-frequency-end down-conversion processing on the first analog signal that has undergone power amplification processing, to generate a second analog signal; the second phase shifter is connected to the second power amplifier, and the second power amplifier is connected to the second frequency mixer to form a receive-end intermediate-frequency processing branch, where the second phase shifter is configured to perform weighting processing on the second analog signal according to $Rx_{IF}$; the second power amplifier is configured to perform power amplification processing on the second analog signal that has undergone weighting processing; and the second frequency mixer is configured to perform intermediate-frequency-end down-conversion processing on the second analog signal that has undergone power amplification processing, to generate a third analog signal; the DAC converter is connected to the first processor to form a receive-end precoding processing branch, where the DAC converter is configured to convert the third analog signal into a digital signal; and the first processor is configured to perform, according to $Rx_{BB}$, weighting processing on the third analog signal converted into the digital signal, to obtain the second data stream, where the second data stream is used to perform layer demapping; and the first transceiver is connected to the second processor to form a receive-end feedback branch, where the first transceiver is configured to acquire a channel matrix H, a transmit-end precoding matrix $Tr_{BB}$, a transmit-end intermediate-frequency beamforming matrix $Tr_{IF}$, and a transmit-end radio-frequency-end beamforming matrix $Tr_{RF}$ that are in the feedback information; and the second processor is configured to calculate the angle-of-arrival vector information according to the feedback information and the channel matrix H, and process the channel matrix H, the angle-of-arrival vector information, $Tr_{BB}$, $Tr_{IF}$, and $Tr_{RF}$ by using a second preset iteration function, to obtain $Rx_{BB}$, $Rx_{IF}$, and $Rx_{RF}$.

In a first possible implementation manner of the fourth aspect, the second phase shifter is specifically configured to perform, by the receive end, any one of amplitude weighting and phase weighting, amplitude weighting, and phase weighting on the second analog signal according to $Rx_{IF}$.

According to a fifth aspect, an embodiment of the present application provides a beamforming based communications method, including: obtaining, by a transmit end through calculation, a transmit-end precoding matrix $Tr_{BB}$, a transmit-end intermediate-frequency beamforming matrix $Tr_{IF}$, and a transmit-end radio-frequency-end beamforming matrix $Tr_{RF}$ according to feedback information that is from a receive end, where the feedback information includes a channel matrix H and AOD vector information; acquiring, by the transmit end, a first data stream, and performing precoding processing on the first data stream according to $Tr_{BB}$, to generate a first analog signal, where the first data stream is generated after a bitstream to be sent is scrambled and undergoes layer mapping; performing, by the transmit end, weighting and power amplification processing on the first analog signal according to $Tr_{IF}$, to generate a second analog signal; performing, by the transmit end, weighting and power amplification processing on the second analog signal according to $Tr_{RF}$, to generate a third analog signal; and determining, by the transmit end, an antenna array matching the third analog signal, and transmitting the third analog signal to the receive end by using the antenna array matching the third analog signal.

In a first possible implementation manner of the fifth aspect, the performing precoding processing according to $Tr_{BB}$, to generate a first analog signal includes: performing, by the transmit end, precoding on the first data stream according to $Tr_{BB}$, to obtain a precoding signal; and performing, by the transmit end, digital-to-analog conversion processing on the precoding signal, to generate the first analog signal.

With reference to the fifth aspect or the first possible implementation manner of the fifth aspect, in a second possible implementation manner of the fifth aspect, the performing, by the transmit end, weighting and power amplification processing on the first analog signal according to $Tr_{IF}$, to generate a second analog signal includes: performing, by the transmit end, intermediate-frequency up-conversion processing on the first analog signal; performing, by the transmit end according to $Tr_{IF}$, weighting processing on the first analog signal that has undergone up-conversion; and performing, by the transmit end, power amplification processing on the first analog signal that has undergone weighting processing, to generate the second analog signal.

With reference to the fifth aspect or the first or second possible implementation manner of the fifth aspect, in a third possible implementation manner of the fifth aspect, the performing, by the transmit end, weighting and power amplification processing on the second analog signal according to $Tr_{RF}$, to generate a third analog signal includes: performing, by the transmit end, radio-frequency up-conversion processing on the second analog signal; performing, by the transmit end according to $Tr_{RF}$, weighting processing on the second analog signal that has undergone up-conversion; and performing, by the transmit end, power amplification processing on the second analog signal that has undergone weighting processing, to generate the third analog signal.

With reference to the fifth aspect or any one of the first to third possible implementation manners of the fifth aspect, in a fourth possible implementation manner of the fifth aspect, the transmit end performs, according to $Tr_{IF}$, weighting processing on the first analog signal that has undergone up-conversion, where a manner of the weighting processing is any one of amplitude weighting and phase weighting, amplitude weighting, and phase weighting.

With reference to the fifth aspect or any one of the first to fourth possible implementation manners of the fifth aspect, in a fifth possible implementation manner of the fifth aspect, the obtaining, by a transmit end through calculation, a transmit-end precoding matrix $Tr_{BB}$, a transmit-end intermediate-frequency beamforming matrix $Tr_{IF}$, and a transmit-end radio-frequency-end beamforming matrix $Tr_{RF}$ according to feedback information that is from a receive end includes: acquiring, by the transmit end, the channel matrix H and the angle-of-departure vector information according to the feedback information; and processing, by the transmit end, the channel matrix H and the angle-of-departure vector information by using a first preset iteration function, to obtain $Tr_{BB}$, $Tr_{IF}$, and $Tr_{RF}$.

According to a sixth aspect, an embodiment of the present application provides a beamforming based communications method, including: obtaining, by a receive end through calculation, a receive-end precoding matrix $Rx_{BB}$, a receive-end intermediate-frequency beamforming matrix $Rx_{IF}$, and a receive-end radio-frequency-end beamforming matrix $Rx_{RF}$ according to feedback information that is from a transmit end, where the feedback information includes a channel matrix H, AOA vector information, a transmit-end precoding matrix $Tr_{BB}$, a transmit-end intermediate-frequency beamforming matrix $Tr_{IF}$, and a transmit-end radio-frequency-end beamforming matrix $Tr_{RF}$; acquiring, by the receive end, a fourth analog signal, and performing weighting and power amplification processing on the fourth analog signal according to $Rx_{RF}$, to generate a fifth analog signal; performing, by the receive end, weighting and power amplification processing on the fifth analog signal according to $Rx_{IF}$, to generate a sixth analog signal; and performing, by the receive end, encoding processing on the sixth analog signal according to $Rx_{BB}$, to generate a second data stream, where the second data stream is used to perform layer demapping.

In a first possible implementation manner of the sixth aspect, the performing weighting and power amplification processing on the fourth analog signal according to $Rx_{RF}$, to generate a fifth analog signal includes: performing, by the receive end, weighting processing on the fourth analog signal according to $Rx_{RF}$; performing, by the receive end, power amplification processing on the fourth analog signal that has undergone weighting processing; and performing, by the receive end, radio-frequency down-conversion processing on the fourth analog signal that has undergone power amplification processing, to generate the fifth analog signal.

With reference to the sixth aspect or the first possible implementation manner of the sixth aspect, in a second possible implementation manner of the sixth aspect, the performing, by the receive end, weighting and power amplification processing on the fifth analog signal according to $Rx_{IF}$, to generate a sixth analog signal includes: performing, by the receive end, weighting processing on the fifth analog signal according to $Rx_{IF}$; performing, by the receive end, power amplification processing on the fifth analog signal that has undergone weighting processing; and performing, by the receive end, intermediate frequency down-conversion processing on the fifth analog signal that has undergone power amplification processing, to generate the sixth analog signal.

With reference to the sixth aspect or the first or second possible implementation manner of the sixth aspect, in a third possible implementation manner of the sixth aspect, the performing, by the receive end, encoding processing on the sixth analog signal according to $Rx_{BB}$, to generate a second data stream includes: converting, by the receive end, the sixth analog signal into a digital signal; and performing, by the receive end according to $Rx_{BB}$, weighting processing on the sixth analog signal converted into the digital signal, to obtain the second data stream.

With reference to the sixth aspect or any one of the first to third possible implementation manners of the sixth aspect, in a fourth possible implementation manner of the sixth aspect, the receive end performs weighting processing on the fifth analog signal according to $Rx_{IF}$, where a manner of the weighting processing is any one of amplitude weighting and phase weighting, amplitude weighting, and phase weighting.

With reference to the sixth aspect or any one of the first to fourth possible implementation manners of the sixth aspect, in a fifth possible implementation manner of the sixth aspect, the obtaining, by a receive end through calculation, a receive-end precoding matrix $Rx_{BB}$, a receive-end intermediate-frequency beamforming matrix $Rx_{IF}$, and a receive-end radio-frequency-end beamforming matrix $Rx_{BB}$ according to feedback information that is from a transmit end includes: acquiring, by the receive end, the channel matrix H, the angle-of-arrival vector information, $Tr_{BB}$, $Tr_{IF}$, and $Tr_{RF}$ that are in the feedback information; and processing, by the receive end, the channel matrix H, the angle-of-arrival vector information, $Tr_{BB}$, $Tr_{IF}$, and $Tr_{RF}$ by using a second preset iteration function, to obtain $Rx_{BB}$, $Rx_{IF}$, and $Rx_{RF}$.

According to the beamforming based communications method and apparatus provided in the embodiments of the present application, a beam direction and a beam width can be simultaneously controlled, by using a multi-beam system having a three-level structure, on a basis of reducing complexity of hardware implementation, so that not only a quantity of ADCs/DACs required for beam control is reduced, but also adjustment of a gain can be implemented by adjusting quantities of intermediate-frequency ports and radio-frequency ports.

BRIEF DESCRIPTION OF THE DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

Figure 1:
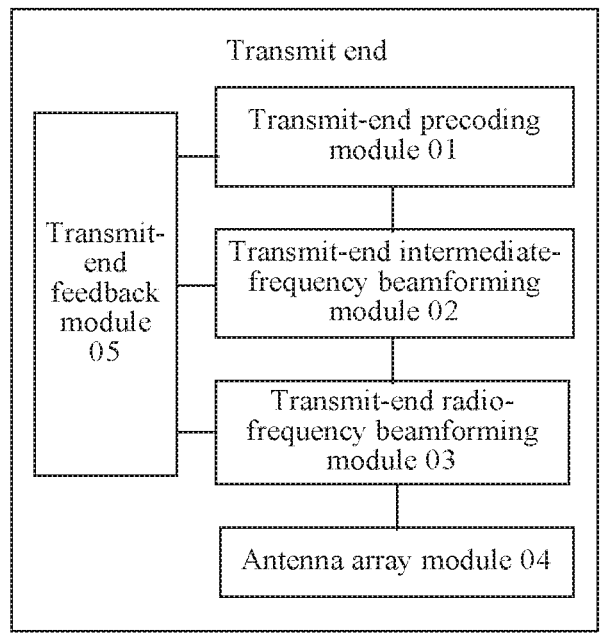
FIG. 1 is a schematic structural diagram of a transmit end according to an embodiment of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

A phased array antenna is an antenna of which a shape of a pattern is changed by controlling a feeding phase of a radiation unit in an array antenna. A direction corresponding to a maximum value in a pattern of an antenna may be changed by controlling a phase, so as to achieve an objective of beam scanning. In a special case, a minor level, a minimum value position, and a shape of an entire pattern may also be controlled, for example, a cosecant-squared pattern is obtained, and the pattern is adaptively controlled. When an antenna is rotated by using a mechanical method, inertia is large, and a speed is low; a phased array antenna overcomes such a disadvantage, and a scanning speed of a beam is high. A feeding phase of the phased array antenna is usually controlled by using an electronic computer, and a changing speed of a phase is high (in a unit of millisecond), that is, a direction corresponding to a maximum value in a pattern of an antenna or another parameter changes quickly.

Beamforming is a combination of an antenna technology and a digital signal processing technology, and is used for directed transmission or reception of a signal. During signal processing performed by a receive end, weighting and synthesis may be performed on signals received by multiple antenna array elements to form a desired ideal signal. From a perspective of a pattern of an antenna, it is equivalent to that a beam in a regulated direction is formed. For example, an original omnidirectional receive pattern is converted into a lobe pattern having a null point and a direction corresponding to a maximum value. The same principle is also applicable to a transmit end, and the transmit end performs amplitude and phase adjustment on feeding of an antenna array element, so that a pattern having a desired shape may be formed. If a beamforming technology needs to be used, a precondition is that a multi-antenna system needs be used to process, by using a particular algorithm at the receive end, signals received by multiple antennas, so that a signal-to-noise ratio of the receive end can be obviously enhanced. Even if the receive end is relatively far, relatively desirable signal quality can also be obtained.

It should be noted that, in the embodiments of the present application, a first analog signal, a second analog signal, a third analog signal, and the like are merely used to distinguish different analog signals, and do not constitute a limitation to an analog signal.

Embodiment 1

This embodiment of the present application provides a transmit end. As shown in FIG. 1, the transmit end includes a transmit-end precoding module 01, a transmit-end intermediate-frequency beamforming module 02, a transmit-end radio-frequency beamforming module 03, an antenna array module 04, and a transmit-end feedback module 05.

The transmit-end feedback module 05 is configured to obtain a transmit-end precoding matrix $Tr_{BB}$, a transmit-end intermediate-frequency beamforming matrix $Tr_{IF}$, and a transmit-end radio-frequency-end beamforming matrix $Tr_{RF}$ according to feedback information that is from a receive end, where the feedback information includes a channel matrix H and AOD vector information.

The transmit-end precoding module 01 is configured to acquire a first data stream, and perform precoding processing on the first data stream according to $Tr_{BB}$, to generate a first analog signal, where the first data stream is generated after a bitstream to be sent is scrambled and undergoes layer mapping.

The transmit-end intermediate-frequency beamforming module 02 is configured to perform weighting and power amplification processing on the first analog signal according to $Tr_{IF}$, to generate a second analog signal.

The transmit-end radio-frequency beamforming module 03 is configured to perform weighting and power amplification processing on the second analog signal according to $Tr_{RF}$, to generate a third analog signal.

The antenna array module 04 is configured to determine an antenna array matching the third analog signal, and transmit the third analog signal to the receive end by using the antenna array matching the third analog signal.

Further, the transmit-end precoding module 01 is specifically configured to perform precoding on the first data stream according to $Tr_{BB}$, to obtain a precoding signal; and perform digital-to-analog conversion processing on the precoding signal, to generate the first analog signal.

Further, the transmit-end intermediate-frequency beamforming module 02 is specifically configured to perform intermediate-frequency-end up-conversion processing on the first analog signal; perform, according to $Tr_{IF}$, weighting processing on the first analog signal that has undergone intermediate-frequency-end up-conversion; and perform power amplification processing on the first analog signal that has undergone weighting processing, to generate the second analog signal.

Further, the transmit-end radio-frequency beamforming module 03 is specifically configured to perform radio-frequency-end up-conversion processing on the second analog signal; perform, according to $Tr_{RF}$, weighting processing on the second analog signal that has undergone radio-frequency-end up-conversion; and perform power amplification processing on the second analog signal that has undergone weighting processing, to generate the third analog signal.

Further, the transmit-end intermediate-frequency beamforming module 02 is specifically configured to perform, according to $Tr_{IF}$, weighting processing on the first analog signal that has undergone up-conversion, where a manner of the weighting processing may be any one of amplitude weighting and phase weighting, amplitude weighting, and phase weighting.

Further, the transmit-end feedback module 05 is specifically configured to acquire the channel matrix H and the angle-of-departure vector information according to the feedback information; and process the channel matrix H and the angle-of-departure vector information by using a first preset iteration function, to obtain $Tr_{BB}$, $Tr_{IF}$, and $Tr_{RF}$.

Accordingly, the transmit end sends, to the receive end, the received first data stream that has undergone three processing processes, that is, baseband precoding processing, intermediate-frequency beamforming processing, and radio-frequency beamforming processing. Compared with the prior art, this solution can bring beneficial effects in multiple aspects: First, a quantity of ADCs/DACs required in beam control using a three-level structure is reduced. It is assumed that beam control is implemented in two cases. In case 1, three-level beam control is used, and in case 2, two-level beam control is used. It is assumed that radio-frequency beamforming matrices corresponding to the two cases have same dimensionality. In case 1, a relatively small precoding matrix is used in a baseband part, and weighting processing is performed on a signal in an intermediate-frequency part, so that dimensionality of an array may be further increased. In case 2, a baseband precoding matrix is directly used for processing. As known from comparison, a quantity of ADCs/DACs required in case 1 is less than that in case 2. Second, for each channel, a required gain can be conveniently adjusted according to a complexity requirement. As can be seen from the foregoing solution, for each data stream, adjustment of a gain can be flexibly implemented through IF processing and RF processing, and herein, can be implemented by adjusting a quantity of IF output ports. Third, an error in a beam direction is smaller; in addition, when three-level beam control is used, a difference from two-level beam control is that one more level of beam control is added at an intermediate frequency end, and one of the following manners can be selected for a weighting manner:

(1) amplitude weighting and phase weighting;
(2) amplitude weighting; and
(3) phase weighting.

As known from comparison, a three-level beam control system obtains a more accurate beam direction and has a smaller error. Fourth, in this solution, a quantity of levels may be selected according to an actual requirement of a user; and a switch of each level is controlled according to an actual requirement of the user, and level 1/level 2/level 3 may be separately selected to control a beam direction.

In this solution, a beam direction and beam precision can be simultaneously controlled, by using a multi-beam system having a three-level structure, on a basis of reducing complexity of hardware implementation, so that not only a quantity of analog to digital converters (ADCs)/digital to analog converters (DACs) required for beam control is reduced, but also adjustment of a gain can be implemented by adjusting quantities of intermediate-frequency ports and radio-frequency ports.

Embodiment 2

Figure 2:
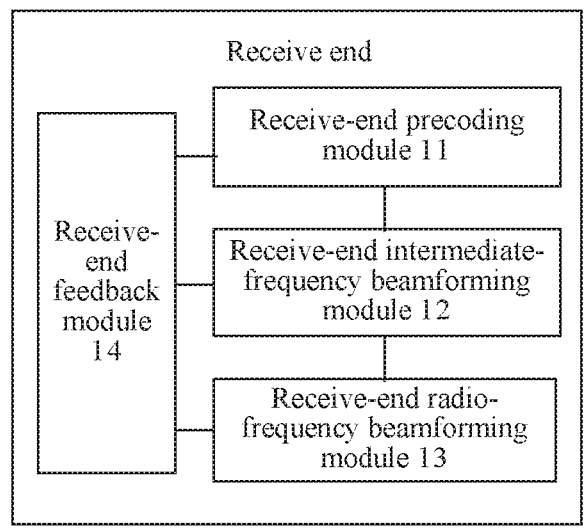
FIG. 2 is a schematic structural diagram of a receive end according to an embodiment of the present application.

This embodiment of the present application provides a receive end. As shown in FIG. 2, the receive end includes a receive-end precoding module 11, a receive-end intermediate-frequency beamforming module 12, a receive-end radio-frequency beamforming module 13, and a receive-end feedback module 14.

The receive-end feedback module 14 is configured to obtain, through calculation, a receive-end precoding matrix $Rx_{BB}$, a receive-end intermediate-frequency beamforming matrix $Rx_{IF}$, and a receive-end radio-frequency-end beamforming matrix $Rx_{RF}$ according to feedback information that is from a transmit end, where the feedback information includes a channel matrix H, angle-of-arrival (AOA) vector information, a transmit-end precoding matrix $Tr_{BB}$, a transmit-end intermediate-frequency beamforming matrix $Tr_{IF}$, and a transmit-end radio-frequency-end beamforming matrix $Tr_{RF}$.

The receive-end radio-frequency beamforming module 13 is configured to acquire a first analog signal, and perform weighting and power amplification processing on the first analog signal according to $Rx_{RF}$, to generate a second analog signal.

The receive-end intermediate-frequency beamforming module 12 is configured to perform weighting and power amplification processing on the second analog signal according to $Rx_{IF}$, to generate a third analog signal.

The receive-end precoding module 11 is configured to perform encoding processing on the third analog signal according to $Rx_{BB}$, to generate a second data stream, where the second data stream is used to perform layer demapping.

Further, the receive-end radio-frequency beamforming module 11 is specifically configured to perform, by the receive end, weighting processing on the first analog signal according to $Rx_{RF}$; perform power amplification processing on the first analog signal that has undergone weighting processing; and perform radio-frequency-end down-conversion processing on the first analog signal that has undergone power amplification processing, to generate the second analog signal.

Further, the receive-end intermediate-frequency beamforming module 12 is specifically configured to perform weighting processing on the second analog signal according to $Rx_{IF}$; perform power amplification processing on the second analog signal that has undergone weighting processing; and perform intermediate-frequency-end down-conversion processing on the second analog signal that has undergone power amplification processing, to generate the third analog signal.

Further, the receive-end precoding module 11 is specifically configured to convert the third analog signal into a digital signal; and perform, according to $Rx_{BB}$, weighting processing on the third analog signal converted into the digital signal, to obtain the second data stream.

Further, the receive-end intermediate-frequency beamforming module 12 is specifically configured to perform weighting processing on the second analog signal according to $Rx_{IF}$, where a manner of the weighting processing is any one of amplitude weighting and phase weighting, amplitude weighting, and phase weighting.

Further, the receive-end feedback module 14 is specifically configured to acquire the channel matrix H, the angle-of-arrival vector information, the transmit-end precoding matrix $Tr_{BB}$, the transmit-end intermediate-frequency beamforming matrix $Tr_{IF}$, and the transmit-end radio-frequency-end beamforming matrix $Tr_{RF}$ that are in the feedback information; and process the channel matrix H, the angle-of-arrival vector information, $Tr_{BB}$, $Tr_{IF}$, and $Tr_{RF}$ by using a second preset iteration function, to obtain $Rx_{BB}$, $Rx_{IF}$, and $Rx_{RF}$.

According to the receive end provided in this embodiment of the present application, the receive end obtains a receive-end precoding matrix $Rx_{BB}$, a receive-end intermediate-frequency beamforming matrix $Rx_{IF}$, and a receive-end radio-frequency-end beamforming matrix $Rx_{RF}$ according to feedback information that is from a transmit end, where the feedback information includes a channel matrix H, AOA vector information, a transmit-end precoding matrix $Tr_{BB}$, a transmit-end intermediate-frequency beamforming matrix $Tr_{IF}$, and a transmit-end radio-frequency-end beamforming matrix $Tr_{RF}$; the receive end acquires a first analog signal, and performs weighting and power amplification processing on the first analog signal according to $Rx_{RF}$, to generate a second analog signal; the receive end performs weighting and power amplification processing on the second analog signal according to $Rx_{IF}$, to generate a third analog signal; and the receive end performs encoding processing on the third analog signal according to $Rx_{BB}$, to generate a second data stream, where the second data stream is used to perform layer demapping. The receive end can simultaneously control, by using a multi-beam system having a three-level structure, a beam direction and a beam width on a basis of reducing complexity of hardware implementation, so that not only a quantity of ADCs/DACs required for beam control is reduced, but also adjustment of a gain can be implemented by adjusting quantities of intermediate-frequency ports and radio-frequency ports.

Embodiment 3

Figure 3:
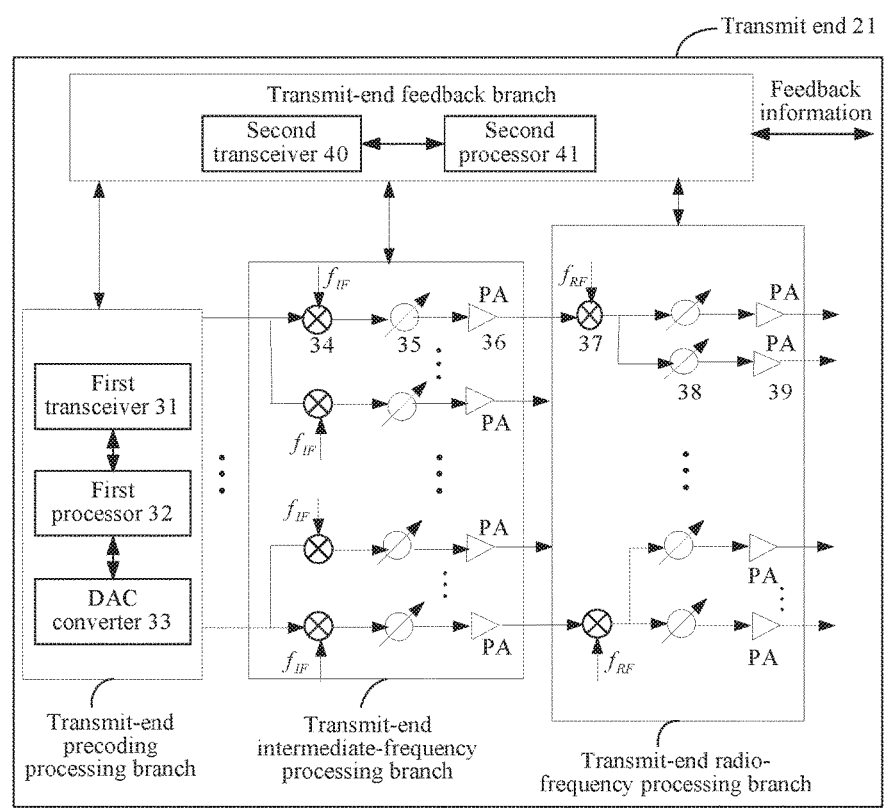
FIG. 3 is a schematic hardware diagram 1 of a transmit end according to an embodiment of the present application.
Figure 4:
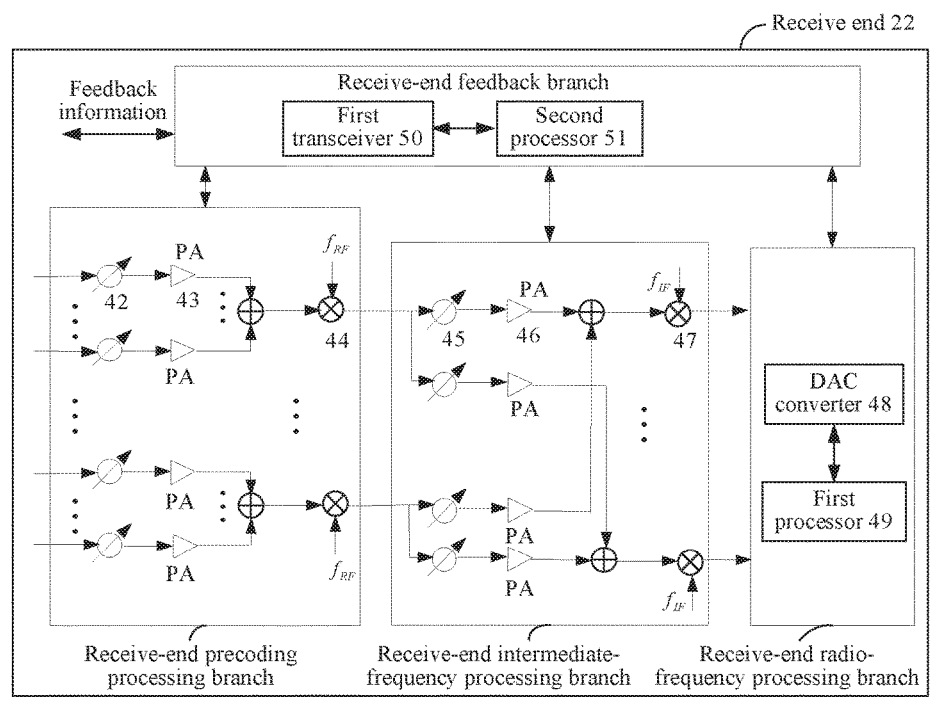
FIG. 4 is a schematic hardware diagram of a receive end according to an embodiment of the present application.

FIG. 3 and FIG. 4 are schematic hardware diagrams of a beamforming based communications apparatus according to the present application.

The large-array beamforming based communications apparatus includes a transmit end 21 and a receive end 22.

As shown in FIG. 3, the transmit end 21 includes a first processor 32, a second processor 41, a first transceiver 31, a second transceiver 40, a DAC converter 33, a first frequency mixer 34, a second frequency mixer 37, a first phase shifter 35, a second phase shifter 38, a first power amplifier 36, and a second power amplifier 39.

Specifically, the first transceiver 31 is connected to the first processor 32, and the first processor 32 is connected to the DAC converter 33 to form a transmit-end precoding processing branch, where the first transceiver 31 is configured to receive the first data stream and send the first data stream to the first processor 32; the first processor 32 is configured to multiply the first data stream by $Tr_{BB}$; and the DAC converter 33 performs digital-to-analog conversion processing on the first data stream that is obtained after being multiplied by $Tr_{BB}$, to generate the first analog signal, where the first data stream is generated after a bitstream to be sent is scrambled and undergoes layer mapping. It should be noted that, there may be one or more DAC converters 33, which is not limited in this embodiment of the present application.

The first frequency mixer 34 is connected to the first phase shifter 35, and the first phase shifter 35 is connected to the first power amplifier 36 to form a transmit-end intermediate-frequency processing branch, where the first frequency mixer 34 is configured to perform, by the transmit end, intermediate-frequency-end up-conversion processing on the first analog signal; the first phase shifter 35 is configured to perform, according to $Tr_{IF}$, weighting processing on the first analog signal that has undergone intermediate-frequency-end up-conversion processing; and the first power amplifier 36 is configured to perform power amplification processing on the first analog signal that has undergone weighting processing, to generate the second analog signal.

The second frequency mixer 37 is connected to the second phase shifter 38, and the second phase shifter 38 is connected to the second power amplifier 39 to form a transmit-end radio-frequency processing branch, where the second frequency mixer 37 is configured to perform radio-frequency-end up-conversion processing on the second analog signal; the second phase shifter 38 is configured to perform, according to $Tr_{RF}$, weighting processing on the second analog signal that has undergone radio-frequency-end up-conversion processing; and the second power amplifier 39 is configured to perform power amplification processing on the second analog signal that has undergone weighting processing, to generate the third analog signal.

The second transceiver 40 is connected to the second processor 41 to form a transmit-end feedback branch, where the second transceiver 40 is configured to acquire a channel matrix H according to the feedback information; the second processor 41 is configured to calculate the angle-of-departure vector information according to the channel matrix H and the feedback information, and process the channel matrix H and the angle-of-departure vector information by using a first preset iteration function, to obtain $Tr_{BB}$, $Tr_{IF}$, and $Tr_{RF}$.

The transmit-end precoding processing branch, the transmit-end intermediate-frequency processing branch, and the transmit-end radio-frequency processing branch are separately connected to the transmit-end feedback branch.

Further, the first phase shifter 35 is specifically configured to perform any one of amplitude weighting and phase weighting, amplitude weighting, and phase weighting on the second analog signal that has undergone intermediate-frequency-end up-conversion.

As shown in FIG. 4, the receive end 22 includes a first phase shifter 42, a second phase shifter 45, a first power amplifier 43, a second power amplifier 46, a first frequency mixer 44, a second frequency mixer 47, a DAC converter 48, a first processor 49, a second processor 51, and a first transceiver 50.

The first phase shifter 42 is connected to the first power amplifier 43, and the first power amplifier 43 is connected to the first frequency mixer 44 to form a receive-end radio-frequency processing branch, where the first phase shifter 42 is configured to perform weighting processing on the first analog signal according to $Rx_{RF}$; the first power amplifier 43 is configured to perform power amplification processing on the first analog signal that has undergone weighting processing; and the first frequency mixer 44 is configured to perform radio-frequency-end down-conversion processing on the first analog signal that has undergone power amplification processing, to generate a second analog signal.

The second phase shifter 45 is connected to the second power amplifier 46, and the second power amplifier 46 is connected to the second frequency mixer 47 to form a receive-end intermediate-frequency processing branch, where the second phase shifter 45 is configured to perform weighting processing on the second analog signal according to $Rx_{IF}$; the second power amplifier 46 is configured to perform power amplification processing on the second analog signal that has undergone weighting processing; and the second frequency mixer 47 is configured to perform intermediate-frequency-end down-conversion processing on the second analog signal that has undergone power amplification processing, to generate a third analog signal.

The DAC converter 48 is connected to the first processor 49 to form a receive-end precoding processing branch, where the DAC converter 48 is configured to convert the third analog signal into a digital signal; and the first processor 49 is configured to perform, according to $Rx_{BB}$, weighting processing on the third analog signal converted into the digital signal, to obtain the second data stream, where the second data stream is used to perform layer demapping.

The first transceiver 50 is connected to the second processor 51 to form a receive-end feedback branch, where the first transceiver 50 is configured to acquire a channel matrix H, a transmit-end precoding matrix $Tr_{BB}$, a transmit-end intermediate-frequency beamforming matrix $Tr_{IF}$, and a transmit-end radio-frequency-end beamforming matrix $Tr_{RF}$ that are in the feedback information; and the second processor 51 is configured to calculate the angle-of-arrival vector information according to the feedback information and the channel matrix H, and process the channel matrix H, the angle-of-arrival vector information, $Tr_{BB}$, $Tr_{IF}$, and $Tr_{RF}$ by using a second preset iteration function, to obtain $Rx_{BB}$, $Rx_{IF}$, and $Rx_{RF}$.

The receive-end precoding processing branch, the receive-end intermediate-frequency processing branch, and the receive-end radio-frequency processing branch are separately connected to the receive-end feedback branch.

Further, the second phase shifter 45 is specifically configured to perform, by the receive end, any one of amplitude weighting and phase weighting, amplitude weighting, and phase weighting on the second analog signal according to $Rx_{IF}$.

It should be noted that, functions of the first transceiver and the second transceiver involved in this embodiment of the present application may be accomplished by one transceiver; correspondingly, functions of the first processor and the second processor may be accomplished by one processor; and functions of the first frequency mixer and the second frequency mixer may be accomplished by one transceiver.

Accordingly, the receive end sends, to the transmit end, the received first data stream that has undergone three processing processes, that is, radio-frequency beamforming processing, intermediate-frequency beamforming processing, and baseband precoding processing. Compared with the prior art, this solution can bring beneficial effects in multiple aspects. First, a quantity of ADCs/DACs required in beam control using a three-level structure is reduced. It is assumed that beam control is implemented in two cases. In case 1, three-level beam control is used, and in case 2, two-level beam control is used. It is assumed that radio-frequency beamforming matrices corresponding to the two cases have same dimensionality. In case 1, a relatively small precoding matrix is used in a baseband part, and weighting processing is performed on a signal in an intermediate-frequency part, so that dimensionality of an array may be further increased. In case 2, a baseband precoding matrix is directly used for processing. As known from comparison, a quantity of ADCs/DACs required in case 1 is less than that in case 2. Second, for each channel, a required gain can be conveniently adjusted according to a complexity requirement. As can be seen from the foregoing method, for each data stream, adjustment of a gain can be flexibly implemented through intermediate frequency (IF) processing and radio frequency (RF) processing, and herein, can be implemented by adjusting a quantity of IF output ports. Third, an error in a beam direction is smaller; in addition, when three-level beam control is used, a difference from two-level beam control is that one more level of beam control is added at an intermediate frequency end, and one of the following forms can be selected for a weighting manner:

(1) amplitude weighting and phase weighting;
(2) amplitude weighting; and
(3) phase weighting.

As known from comparison, a three-level beam control system obtains a more accurate beam direction and has a smaller error. Fourth, in this solution, a quantity of levels may be selected according to an actual requirement of a user; and a switch of each level is controlled according to an actual requirement of the user, and level 1/level 2/level 3 may be separately selected to control a beam direction.

According to the beamforming based communications apparatus provided in this embodiment of the present application, the apparatus can simultaneously control, by using a multi-beam system having a three-level structure, a beam direction and a beam width on a basis of reducing complexity of hardware implementation, so that not only a quantity of ADCs/DACs required for beam control is reduced, but also adjustment of a gain can be implemented by adjusting quantities of intermediate-frequency ports and radio-frequency ports.

Embodiment 4

Figure 5:
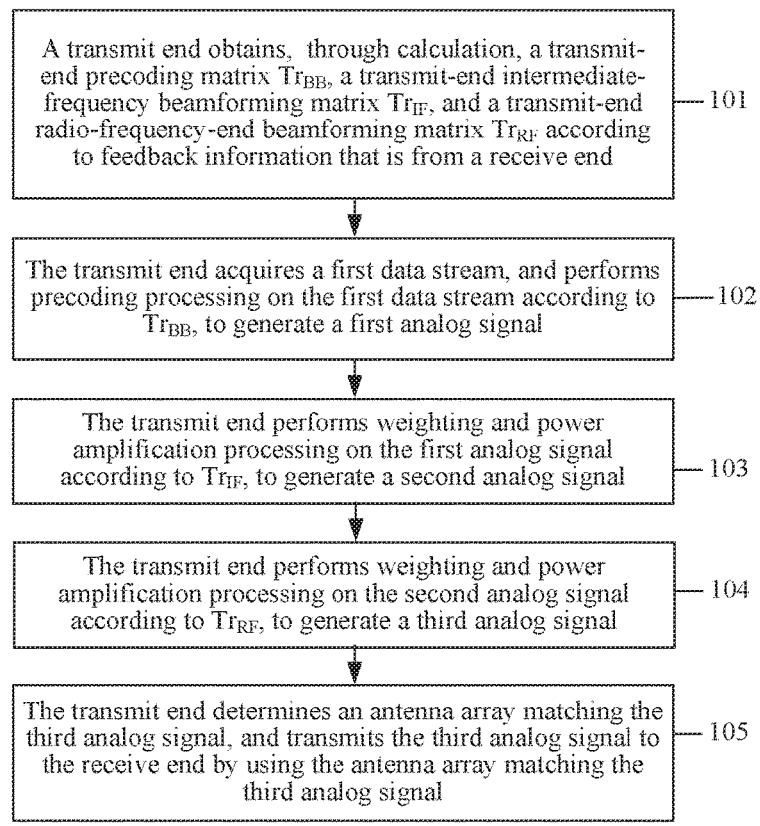
FIG. 5 is a schematic flowchart 1 of a beamforming based communications method according to an embodiment of the present application.

This embodiment of the present application provides a beamforming based communications method. As shown in FIG. 5, the method includes.

101: A transmit end obtains, through calculation, a transmit-end precoding matrix $Tr_{BB}$, a transmit-end intermediate-frequency beamforming matrix $Tr_{IF}$, and a transmit-end radio-frequency-end beamforming matrix $Tr_{RF}$ according to feedback information that is from a receive end.

According to the beamforming based communications method provided in this embodiment of the present application, a beam direction and a beam width can be simultaneously controlled, by using a multi-beam system having a three-level structure, on a basis of reducing complexity of hardware implementation, so that not only a quantity of ADCs/DACs required for beam control is reduced, but also adjustment of a gain can be implemented by adjusting quantities of intermediate-frequency ports and radio-frequency ports. The feedback information includes a channel matrix H and AOD vector information.

Figure 6:
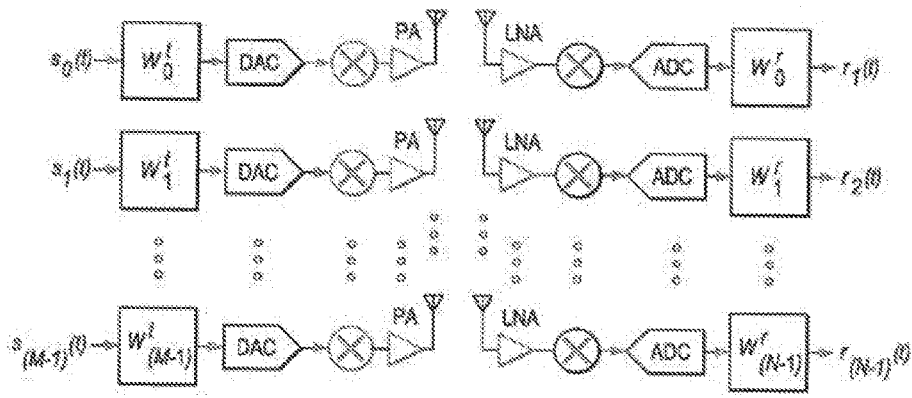
FIG. 6 is a schematic structural diagram 1 of a beamforming method in the prior art.
Figure 7:
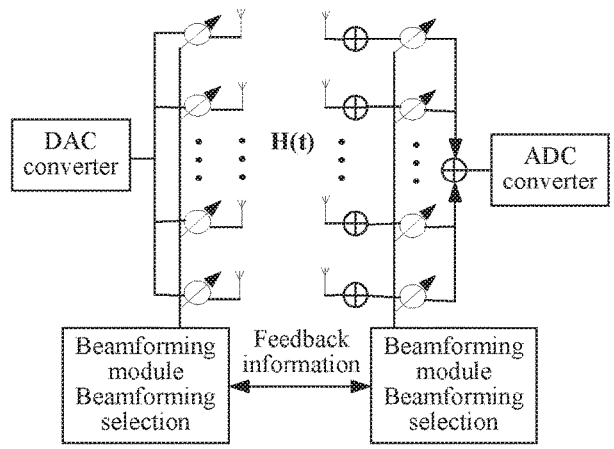
FIG. 7 is a schematic structural diagram 2 of a beamforming method in the prior art.
Figure 8A:
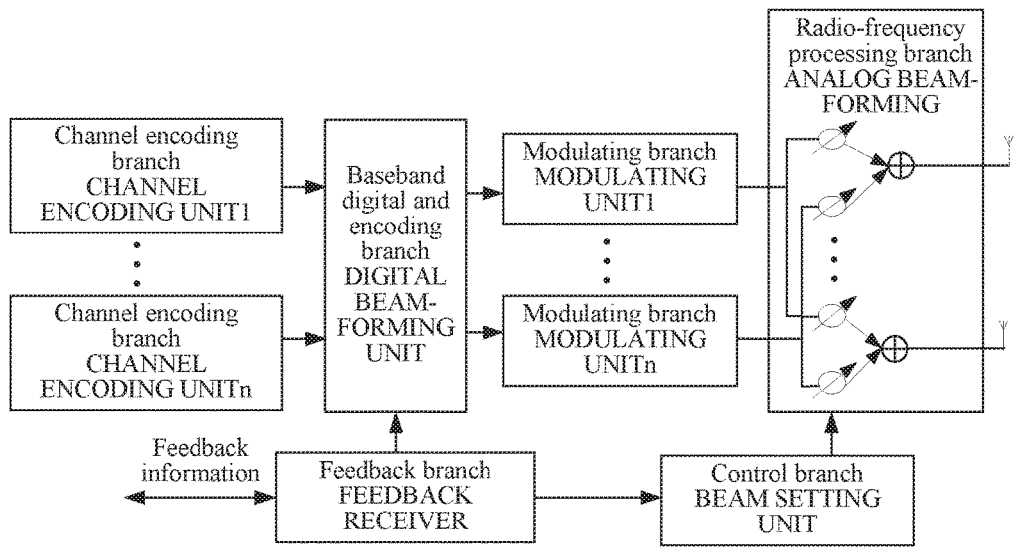
FIG. 8a is a schematic structural diagram 3 of a beamforming method in the prior art.
Figure 8B:
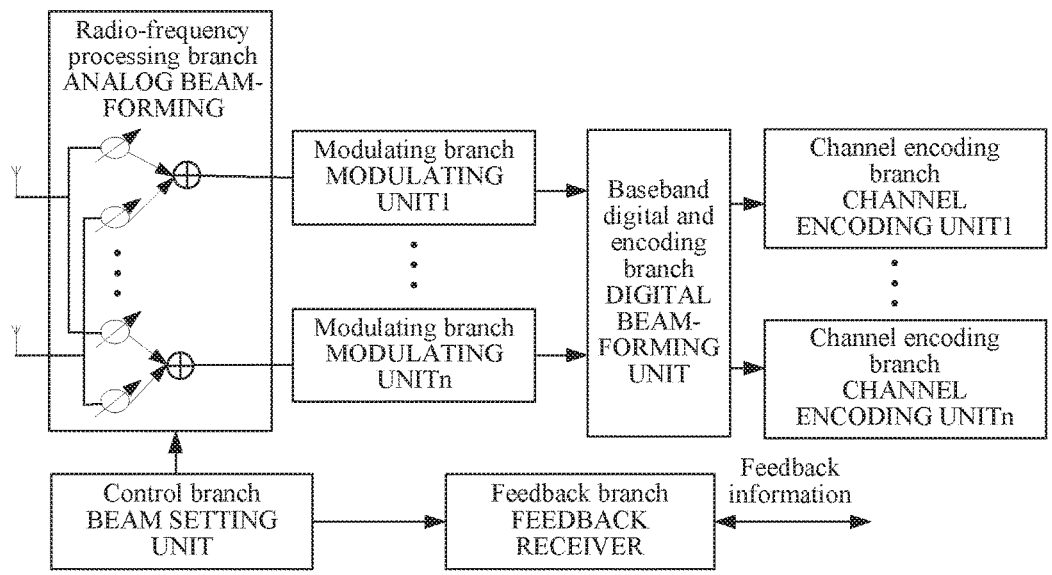
FIG. 8b is a schematic structural diagram 4 of a beamforming method in the prior art.

In the prior art, schemes of implementing a large-array beamforming technology may be basically classified into three types: a beamforming scheme based on digital precoding, a beamforming scheme based on analog phase shifters, and a hybrid beamforming scheme based on a digital and analog two-level-controller. FIG. 6 shows the beamforming scheme based on digital precoding, in which a beam direction is controlled by adjusting a weighted value of a 615/625 digital precoding matrix, and the scheme is used to control beamforming. However, when a digital beamforming scheme is used to control a beam, causing a reduction in a side lobe level, a main lobe beam is broadened, and a gain is reduced; moreover, in the scheme, a very large quantity of ADC/DAC devices are required on a radio-frequency link, which causes very high costs and power consumption in hardware implementation; therefore, the digital beamforming scheme has relatively low practicability. FIG. 7 shows the beamforming scheme based on analog phase shifters, in which a beam direction is controlled by changing an angle of direction of a phase shifter. Generation of a weighted value of the phase shifter may be processed at a digital end. Compared with the beamforming scheme based on digital precoding, in the scheme, although a quantity of required DACs/ADCs may be reduced, the weighted value of the phase shifter can be adjusted by only relying on simulation, causing that flexibility of beam control is reduced. FIG. 8a and FIG. 8b show the hybrid beamforming scheme based on a digital and analog two-level-controller. FIG. 8a is a schematic structural diagram of a transmit end of the digital and analog hybrid beamforming scheme. FIG. 8b is a schematic structural diagram of a receive end of the digital and analog hybrid beamforming scheme. In the scheme, a digital precoding matrix and an analog beamforming matrix are obtained by estimation performed by using feedback information to implement beam control. The scheme implements a compromise between complexity of hardware implementation and scheme performance. However, in aspects such as control of precision of a beam direction and a beam width as well as a quantity of ADCs/DACs to be used, the scheme still needs to be improved. Therefore, this embodiment of the present application provides the beamforming based communications method, and a quantity of ADCs/DACs required on a radio-frequency link may be reduced by controlling a beam by combining multiple levels, so that low precision of an error in a direction and low complexity in hardware implementation are ensured while a large-scale antenna array is implemented. In addition, a quantity of levels of beam control may be adaptively selected according to an actual requirement of a user, thereby achieving an objective of optimizing resource allocation or improving communication quality.

Specifically, at the transmit end, three processing processes, that is, baseband precoding processing, intermediate-frequency beamforming processing, and radio-frequency beamforming processing are included. During the baseband precoding processing, intermediate-frequency beamforming processing, and radio-frequency beamforming processing, the transmit-end precoding matrix $Tr_{BB}$, the transmit-end intermediate-frequency beamforming matrix $Tr_{IF}$, and the transmit-end radio-frequency-end beamforming matrix $Tr_{RF}$ need to be used to perform weighting processing on a signal. Therefore, the transmit end first acquires a channel matrix H according to the feedback information that is from the receive end; and the transmit end further calculates angle-of-departure vector information according to the channel matrix H and the feedback information, and processes the channel matrix H and the angle-of-departure vector information by using a first preset iteration function, to obtain $Tr_{BB}$, $Tr_{IF}$, and $Tr_{RF}$.

The channel matrix H is a channel state information, and any information reflecting a channel is referred to as channel state information. A channel matrix is only one type of channel state information in a multiple-input multiple-output (MIMO) system. Other information such as a Channel profile, a multipath delay, a Doppler frequency shift, a rank of a MIMO channel, and a beamforming vector are all channel state information.

SVD (singular value decomposition) is one type of matrix decomposition. A matrix is decomposed into multiple matrices and equals a product of the multiple matrices. SVD is another orthogonal matrix decomposition method. SVD is a most reliable decomposition method; however, SVD takes a calculation time nearly ten times as long as that a QR decomposition method takes. [U, S, V]=svd (A), where U and V denote two matrices orthogonal to each other, and S denotes a diagonal matrix. An original matrix A is not necessarily a square matrix. The use of an SVD decomposition method is to calculate a minimum square error and perform data compression.

A least square method is a mathematical optimization technology. In the least square method, an optimal function match for data is found by using a quadratic sum of a minimum error. Unknown data can be easily calculated by using the least square method, so that errors between these data obtained through calculation and actual data have a minimum quadratic sum. The least square method may also be used for curve fitting. Some other optimization problems may also be expressed by using the least square method by minimizing energy or maximizing entropy.

In addition, this embodiment provides a method of obtaining, by the transmit end through calculation, the transmit-end precoding matrix $Tr_{BB}$, the transmit-end intermediate-frequency beamforming matrix $Tr_{IF}$, and the transmit-end radio-frequency-end beamforming matrix $Tr_{RF}$, and the method is described in detail in Embodiment 6, and therefore, details are not described herein again.

102: The transmit end acquires a first data stream, and performs precoding processing on the first data stream according to $Tr_{BB}$, to generate a first analog signal.

The first data stream is generated after a bitstream to be sent is scrambled and undergoes layer mapping.

Specifically, the transmit end acquires the first data stream, where the data stream may include Ns information streams, and the transmit end further multiplies the first data stream by $Tr_{BB}$; the transmit end then performs digital-to-analog conversion processing on the first data stream that is obtained after being multiplied by $Tr_{BB}$, to generate the first analog signal, where the matrix $Tr_{BB}$ is provided by a feedback module.

103: The transmit end performs weighting and power amplification processing on the first analog signal according to $Tr_{IF}$, to generate a second analog signal.

Specifically, after the transmit end generates the first analog signal, the transmit end performs intermediate-frequency-end up-conversion processing on the first analog signal; the transmit end then performs, according to $Tr_{IF}$, weighting processing on the first analog signal that has undergone up-conversion; and the transmit end further performs power amplification processing on the first analog signal that has undergone weighting processing, to generate the second analog signal. Compared with step 102, during intermediate-frequency processing, a quantity of antenna array elements is increased, and is used to generate a directed wireless electromagnetic wave. An antenna includes array elements in different directions, and can generate a multi-beam electromagnetic wave, where the intermediate-frequency beamforming matrix $Tr_{IF}$ is provided by the feedback module.

Further, the performing, by the transmit end according to $Tr_{IF}$, weighting processing on the first analog signal that has undergone up-conversion may include: performing, by the transmit end according to $Tr_{IF}$, amplitude weighting on the first analog signal that has undergone intermediate-frequency-end up-conversion; or performing, by the transmit end according to $Tr_{IF}$, phase weighting on the first analog signal that has undergone intermediate-frequency-end up-conversion; or performing, by the transmit end according to $Tr_{IF}$, amplitude and phase weighting on the first analog signal that has undergone intermediate-frequency-end up-conversion.

Figure 9:
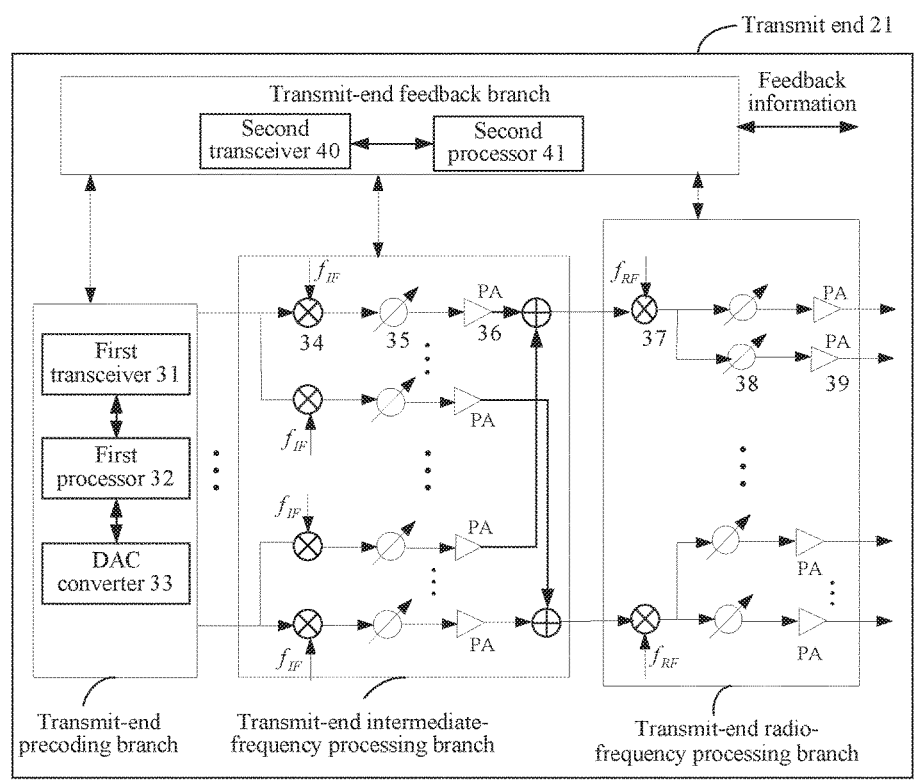
FIG. 9 is a schematic hardware diagram 2 of a transmit end according to an embodiment of the present application.

Further alternatively, as shown in FIG. 9, after the transmit end performs power amplification processing on the first analog signal that has undergone weighting processing, combined processing may be further performed on a first analog signal by using a combiner. In comparison with FIG. 3, a quantity of output antenna ports at an intermediate frequency end is a quantity obtained by multiplying a quantity of radio-frequency links by a quantity of antennas corresponding to each intermediate frequency channel in FIG. 3, and a quantity of output antenna ports at an intermediate frequency end is consistent with a quantity of radio-frequency links in FIG. 9.

For high-frequency wireless communication, a radio frequency end has a very high requirement for a sampling rate, causing a very strict requirement on a hardware device. It is proposed in this scheme to use three-level combined beam control, and one level of an intermediate frequency control module is added before a radio frequency module to control a beam, so that a requirement on a hardware device can be lowered, and complexity in hardware implementation is reduced; there is one more level of beam control, and therefore, a required gain can be flexibly implemented by adjusting a quantity of output ports at an intermediate frequency end.

104. The transmit end performs weighting and power amplification processing on the second analog signal according to $Tr_{RF}$, to generate a third analog signal.

Specifically, after the transmit end generates the second analog signal, the transmit end performs radio-frequency-end up-conversion processing on the second analog signal; the transmit end then performs, according to $Tr_{RF}$, weighting processing on the second analog signal that has undergone up-conversion; and the transmit end further performs power amplification processing on the second analog signal that has undergone weighting processing, to generate the third analog signal. After step 104, the transmit end further increases the quantity of antenna array elements to a required quantity, and finally selects an antenna by using an antenna array to send data.

105: The transmit end determines an antenna array matching the third analog signal, and transmits the third analog signal to the receive end by using the antenna array matching the third analog signal.

The antenna array is formed by performing feeding and space arrangement according to a particular requirement. Because directivity of a single antenna is limited, to meet applications in various occasions, feeding and space arrangement is performed, according to a particular requirement, on two or more single antennas working at same frequency, to form an antenna array. Main functions of the antenna array are: (1) strengthening and enhancing directivity of a radiation field; (2) strengthening the radiation field. The antenna array may be regarded as superposition of electromagnetic waves (electromagnetic fields). For several columns of electromagnetic waves, when the electromagnetic waves propagate to a same area, according to a superposition principle, vector superposition of the electromagnetic waves occurs. A superposition result is not only related to amplitudes of the columns of electromagnetic waves, but also is related to phase differences between the electromagnetic waves within an incidence region.

Specifically, after the transmit-end radio-frequency beamforming module generates the third analog signal, because each radio frequency RF link carries multiple antenna array elements, the transmit end may use, according to a different requirement, one RF link to perform spatial weighting to form one beam to send the third analog signal to the receive end in a form of an electromagnetic wave, or may use multiple RF links to perform spatial weighting to form one beam to send the third analog signal to the receive end in a form of an electromagnetic wave. In an existing phased array system, a technology of matching an analog signal with an antenna array element is already fully disclosed, and therefore details are not described herein again.

Accordingly, the transmit end sends, to the receive end, the received first data stream that has undergone three processing processes, that is, baseband precoding processing, intermediate-frequency beamforming processing, and radio-frequency beamforming processing, so that precision of a beam direction and a beam width is simultaneously controlled on a basis of reducing complexity in hardware implementation.

According to the beamforming based communications method provided in this embodiment of the present application, a beam direction and a beam width can be simultaneously controlled, by using a multi-beam system having a three-level structure, on a basis of reducing complexity of hardware implementation, so that not only a quantity of ADCs/DACs required for beam control is reduced, but also adjustment of a gain can be implemented by adjusting quantities of intermediate-frequency ports and radio-frequency ports.

Embodiment 5

Figure 10:
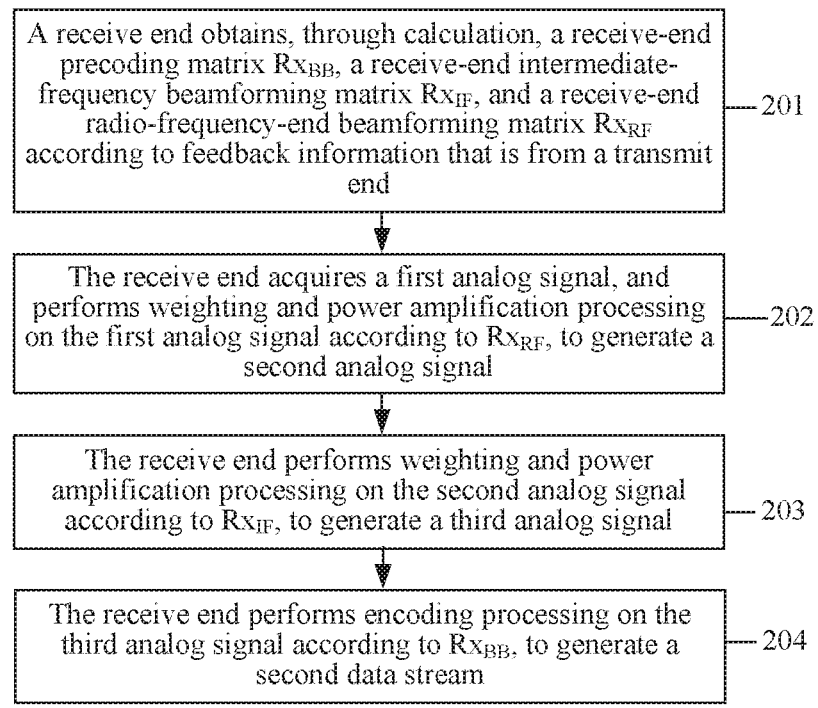
FIG. 10 is a schematic flowchart 2 of a beamforming based communications method according to an embodiment of the present application.

This embodiment of the present application provides a beamforming based communications method. As shown in FIG. 10, the beamforming based communications method includes.

201: A receive end obtains, through calculation, a receive-end precoding matrix $Rx_{BB}$, a receive-end intermediate-frequency beamforming matrix $Rx_{IF}$, and a receive-end radio-frequency-end beamforming matrix $Rx_{RF}$ according to feedback information that is from a transmit end.

The feedback information includes a channel matrix H, AOA vector information, a transmit-end precoding matrix $Tr_{BB}$, a transmit-end intermediate-frequency beamforming matrix $Tr_{IF}$, and a transmit-end radio-frequency-end beamforming matrix $Tr_{RF}$.

According to the beamforming based communications method provided in this embodiment of the present application, a beam direction and a beam width can be simultaneously controlled, by using a multi-beam system having a three-level structure, on a basis of reducing complexity of hardware implementation, so that not only a quantity of ADCs/DACs required for beam control is reduced, but also adjustment of a gain can be implemented by adjusting quantities of intermediate-frequency ports and radio-frequency ports.

Specifically, at the receive end, three processing processes, that is, baseband precoding processing, intermediate-frequency beamforming processing, and radio-frequency beamforming processing are included. During the baseband precoding processing, intermediate-frequency beamforming processing, and radio-frequency beamforming processing, the receive-end precoding matrix $Rx_{BB}$, the receive-end intermediate-frequency beamforming matrix $Rx_{IF}$, and the receive-end radio-frequency-end beamforming matrix $Rx_{RF}$ need to be used to perform weighting processing on a signal. Therefore, the receive end first acquires the channel matrix H, the transmit-end precoding matrix $Tr_{BB}$, the transmit-end intermediate-frequency beamforming matrix $Tr_{IF}$, and the transmit-end radio-frequency-end beamforming matrix $Tr_{RF}$ that are in the feedback information; and the receive end further calculates the angle-of-arrival vector information according to the feedback information and the channel matrix H, and processes the channel matrix H, the angle-of-arrival vector information, $Tr_{BB}$, $Tr_{IF}$, and $Tr_{BB}$ by using a second preset iteration function, to obtain $Rx_{BB}$, $Rx_{IF}$, and $Rx_{RF}$. Specifically, a method for calculating $Rx_{BB}$, $Rx_{IF}$, and $Rx_{RF}$ is described in detail in Embodiment 6, and therefore, details are not described herein again.

202: The receive end acquires a first analog signal, and performs weighting and power amplification processing on the third analog signal according to $Rx_{RF}$, to generate a second analog signal.

Specifically, the receive end acquires the first analog signal from an antenna array, and further performs weighting processing on the first analog signal according to $Rx_{RF}$; the receive end then performs power amplification processing on the first analog signal that has undergone weighting processing; and the receive end finally performs radio-frequency-end down-conversion processing on the first analog signal that has undergone power amplification processing, to generate the second analog signal.

203: The receive end performs weighting and power amplification processing on the second analog signal according to $Rx_{IF}$, to generate a third analog signal.

Specifically, after generating the second analog signal, the receive end performs weighting processing on the second analog signal according to $Rx_{IF}$; the receive end further performs power amplification processing on the second analog signal that has undergone weighting processing; and the receive end finally performs intermediate frequency down-conversion processing on the second analog signal that has undergone power amplification processing, to generate the third analog signal.

Further, the performing, by the receive end, weighting processing on the second analog signal according to $Rx_{IF}$ may include: performing, by the receive end, amplitude weighting on the second analog signal according to $Rx_{IF}$; or performing, by the receive end, phase weighting on the second analog signal according to $Rx_{IF}$; or performing, by the receive end, amplitude and phase weighting on the second analog signal according to $Rx_{IF}$.

204: The receive end performs encoding processing on the third analog signal according to $Rx_{BB}$, to generate a second data stream.

Specifically, after generating the third analog signal, the receive end converts the third analog signal into a digital signal; and the receive end further performs, according to $Rx_{BB}$, weighting processing on the third analog signal converted into the digital signal, to obtain the second data stream, where the second data stream is used to perform layer demapping.

Accordingly, the receive end sends, to the transmit end, the received first data stream that has undergone three processing processes, that is, radio-frequency beamforming processing, intermediate-frequency beamforming processing, and baseband precoding processing, so that precision of a beam direction and a beam width is simultaneously controlled on a basis of reducing complexity of hardware implementation.

According to the beamforming based communications method provided in this embodiment of the present application, a receive end obtains a receive-end precoding matrix $Rx_{BB}$, a receive-end intermediate-frequency beamforming matrix $Rx_{IF}$, and a receive-end radio-frequency-end beamforming matrix $Rx_{RF}$ according to feedback information that is from a transmit end, where the feedback information includes a channel matrix H, AOA vector information, a transmit-end precoding matrix $Tr_{BB}$, a transmit-end intermediate-frequency beamforming matrix $Tr_{IF}$, and a transmit-end radio-frequency-end beamforming matrix $Tr_{RF}$; the receive end acquires a first analog signal, and performs weighting and power amplification processing on the first analog signal according to $Rx_{RF}$, to generate a second analog signal; the receive end performs weighting and power amplification processing on the second analog signal according to $Rx_{IF}$, to generate a third analog signal; and the receive end performs encoding processing on the third analog signal according to $Rx_{BB}$, to generate a second data stream, where the second data stream is used to perform layer demapping. In the solution, a beam direction and a beam width can be simultaneously controlled, by using a multi-beam system having a three-level structure, on a basis of reducing complexity of hardware implementation, so that not only a quantity of ADCs/DACs required for beam control is reduced, but also adjustment of a gain can be implemented by adjusting quantities of intermediate-frequency ports and radio-frequency ports.

Embodiment 6

Figure 11:
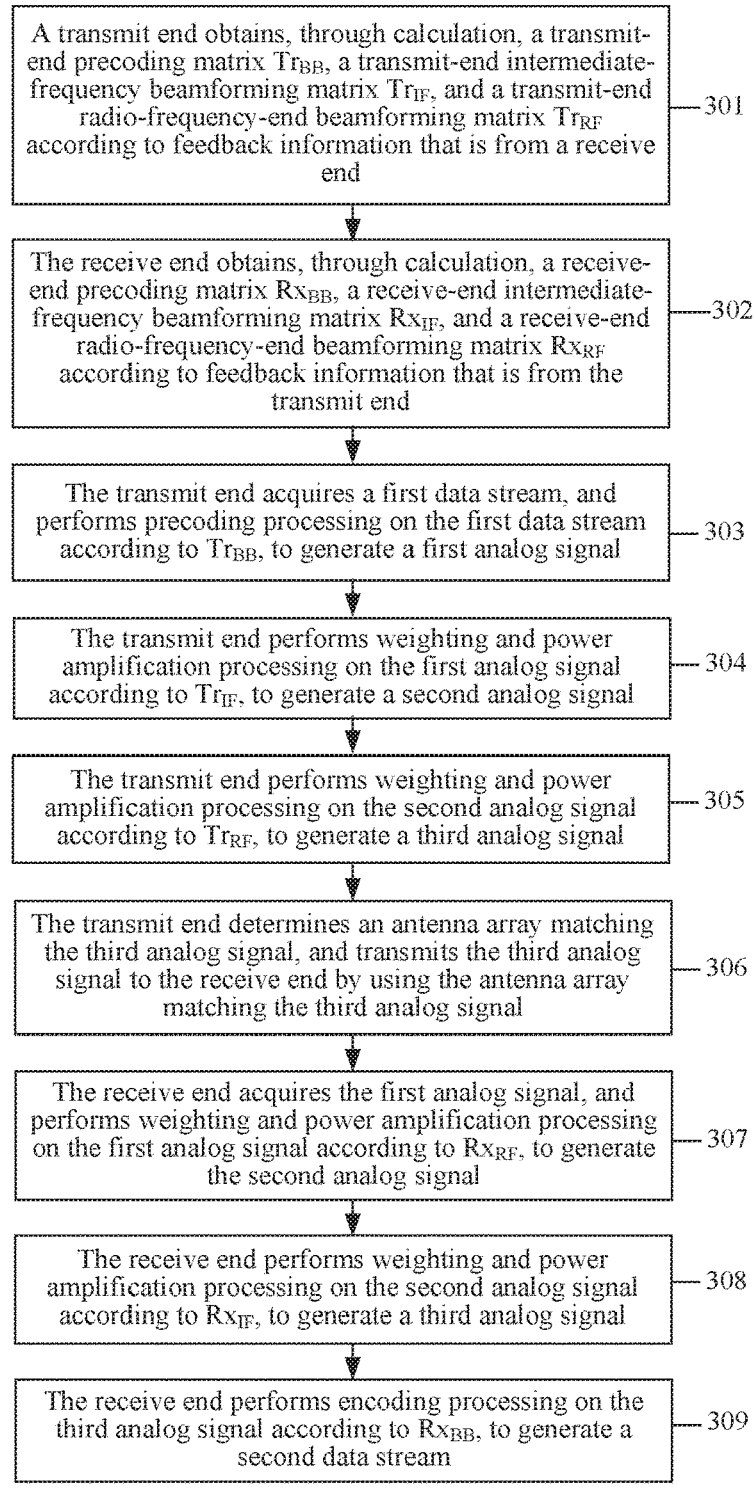
FIG. 11 is a schematic flowchart 3 of a beamforming based communications method according to an embodiment of the present application.

This embodiment of the present application provides a beamforming based communications method. As shown in FIG. 11, the beamforming based communications method includes.

301: A transmit end obtains, through calculation, a transmit-end precoding matrix $Tr_{BB}$, a transmit-end intermediate-frequency beamforming matrix $Tr_{IF}$, and a transmit-end radio-frequency-end beamforming matrix $Tr_{RF}$ according to feedback information that is from a receive end.

According to the beamforming based communications method provided in this embodiment of the present application, a beam direction and a beam width can be simultaneously controlled, by using a multi-beam system having a three-level structure, on a basis of reducing complexity of hardware implementation, so that not only a quantity of ADCs/DACs required for beam control is reduced, but also adjustment of a gain can be implemented by adjusting quantities of intermediate-frequency ports and radio-frequency ports.

In the prior art, schemes of implementing a large-array beamforming technology may be basically classified into three types: a beamforming scheme based on digital precoding, a beamforming scheme based on analog phase shifters, and a hybrid beamforming scheme based on a digital and analog two-level-controller. FIG. 6 shows the beamforming scheme based on digital precoding, in which a beam direction is controlled by adjusting a weighted value of a 615/625 digital precoding matrix, and the scheme is used to control beamforming. However, when a digital beamforming scheme is used to control a beam, causing a reduction in a side lobe level, a main lobe beam is broadened, and a gain is reduced; moreover, in the scheme, a very large quantity of ADC/DAC devices are required on a radio-frequency link, which causes very high costs and power consumption in hardware implementation; therefore, the digital beamforming scheme has relatively low practicability. FIG. 7 shows the beamforming scheme based on analog phase shifters, in which a beam direction is controlled by changing an angle of direction of a phase shifter. Generation of a weighted value of the phase shifter may be processed at a digital end. Compared with the beamforming scheme based on digital precoding, in the scheme, although a quantity of required DACs/ADCs may be reduced, the weighted value of the phase shifter can be adjusted only manually, causing that flexibility of beam control is reduced. FIG. 8*a* and FIG. 8*b* show the hybrid beamforming scheme based on a digital and analog two-level-controller. FIG. 8*a* is a schematic structural diagram of a transmit end of the digital and analog hybrid beamforming scheme. FIG. 8*b* is a schematic structural diagram of a receive end of the digital and analog hybrid beamforming scheme. In the scheme, a digital precoding matrix and an analog beamforming matrix are obtained by estimation performed by using feedback information to implement beam control. The scheme implements a compromise between complexity of hardware implementation and scheme performance. However, in aspects such as control of precision of a beam direction and a beam width as well as a quantity of ADCs/DACs to be used, the scheme still needs to be improved. Therefore, this embodiment of the present application provides the beamforming based communications method, and a quantity of ADCs/DACs required on a radio-frequency link may be reduced by controlling a beam by combining multiple levels, so that low precision of an error in a direction and low complexity in hardware implementation are ensured while a large-scale antenna array is implemented. In addition, a quantity of levels of beam control may be adaptively selected according to an actual requirement of a user, thereby achieving an objective of optimizing resource allocation or improving communication quality.

For high-frequency wireless communication, a radio frequency end has a very high requirement for a sampling rate, causing a very strict requirement on a hardware device. It is proposed in this scheme to use three-level combined beam control, and one level of an intermediate frequency control module is added before a radio frequency module to control a beam, so that a requirement on a hardware device can be lowered, and complexity in hardware implementation is reduced; there is one more level of beam control, and therefore, a required gain can be flexibly implemented by adjusting a quantity of output ports at an intermediate frequency end.

Specifically, at the transmit end, three processing processes, that is, baseband precoding processing, intermediate-frequency beamforming processing, and radio-frequency beamforming processing are included. During the baseband precoding processing, intermediate-frequency beamforming processing, and radio-frequency beamforming processing, the transmit-end precoding matrix $Tr_{BB}$, the transmit-end intermediate-frequency beamforming matrix $Tr_{IF}$, and the transmit-end radio-frequency-end beamforming matrix $Tr_{RF}$ need to be used to perform weighting processing on a signal. Therefore, the transmit end first acquires a channel matrix H according to the feedback information that is from the receive end; and the transmit end further calculates angle-of-departure vector information according to the channel matrix H and the feedback information, and processes the channel matrix H and the angle-of-departure vector information by using a first preset iteration function, to obtain $Tr_{BB}$, $Tr_{IF}$, and $Tr_{RF}$.

Figure 12:
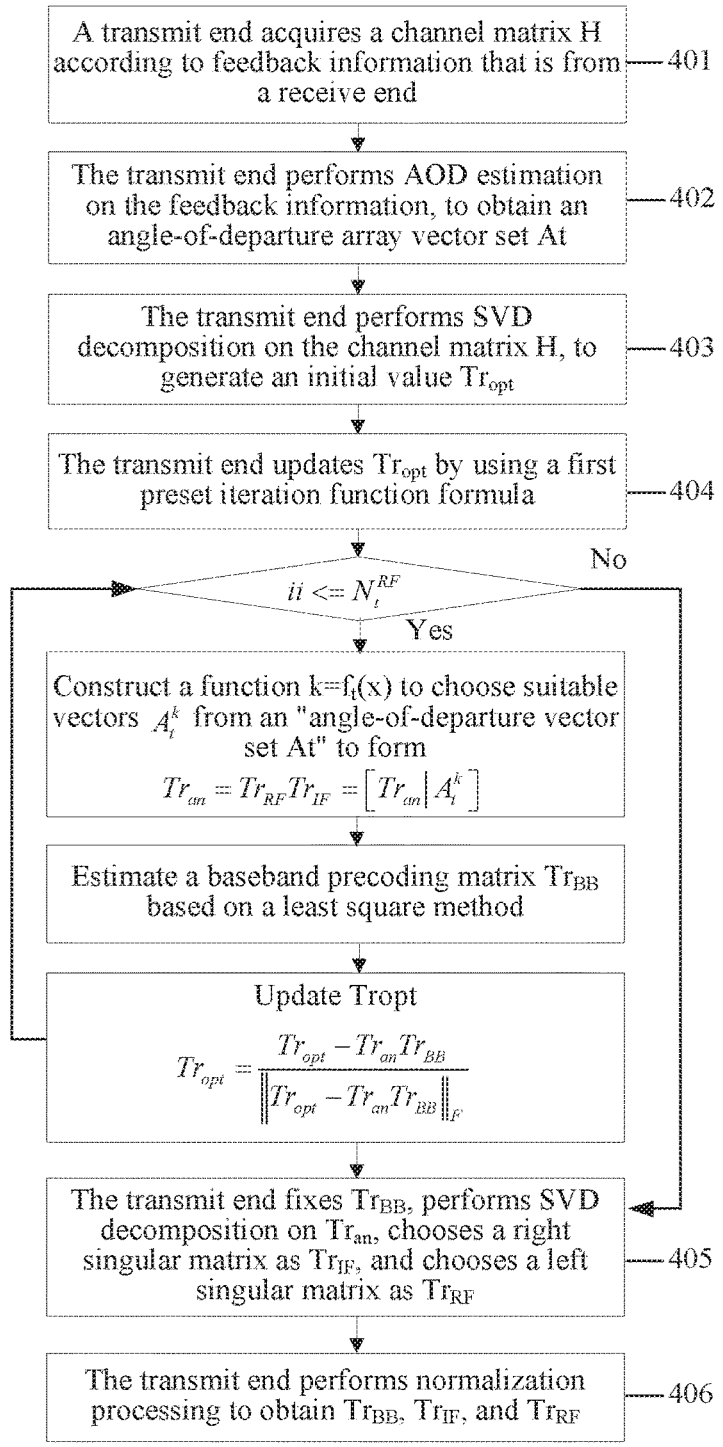
FIG. 12 is a schematic flowchart 4 of a beamforming based communications method according to an embodiment of the present application.

Exemplarily, as shown in FIG. 12, this embodiment of the present application provides a method for constructing a beamforming matrix in a multi-level structure.

401: A transmit end acquires a channel matrix H according to feedback information that is from a receive end.

Specifically, a feedback module in a transmit end in an FDD (frequency division duplex) system may acquire the channel matrix H according to a feedback channel; and a feedback module in a transmit end in a TDD (time division duplex) system may obtain, by means of uplink simple random sampling (SRS) estimation, the channel matrix H based on a channel reciprocity.

TDD is a technology for distinguishing a wireless channel in time in a downlink operation within a frame period and continuing with an uplink operation, is also one of duplex technologies used in mobile communications technologies, and corresponds to FDD.

402: The transmit end performs AOD (Angle-of-departure) estimation on the feedback information, to obtain an angle-of-departure array vector set At.

AOD estimation is a positioning algorithm based on an angle of departure of a signal, and is a typical ranging-based positioning algorithm. An angle of departure of a signal of a transmit node is sensed by using some hardware devices, relative positions or angles of a transmitting node and an anchor node are calculated, and a triangulation method or another manner is then used to calculate a position of an unknown node.

403: The transmit end performs SVD decomposition on the channel matrix H, to generate an initial value $Tr_{opt}$.

SVD decomposition is one type of matrix decomposition (decomposition, factorization). A matrix is decomposed into multiple matrices and equals a product of the multiple matrices. SVD is another orthorgonal matrix decomposition method. SVD is a most reliable decomposition method; however, SVD takes a calculation time nearly ten times as long as that a QR decomposition method takes. [U, S, V]=svd (A), where U and V denote two matrices orthogonal to each other, and S denotes a diagonal matrix. An original matrix A is not necessarily a square matrix. The use of an SVD decomposition method is to calculate a minimum square error and perform data compression.

404: The transmit end updates $Tr_{opt}$ by using a first preset iteration function.

Specifically, an RF (radio frequency) and IF (intermediate frequency) set is estimated through cyclic iteration.

First, a cost function $f_t(x)=(A_t)^{H}*Tr_{opt}$ is constructed, and a cost function $k=\arg \max(f_t(x)*(f_t(x))^{H})$ is used to choose suitable vectors from $A_t$ to form an RF and IF set $Tr_{an}=[Tr_{on}|A_t^{k}]$.

A least square method is further used to estimate a TX baseband precoding matrix $Tr_{BB}$, where $Tr_{BB}=\min\|Tr_{opt}-Tr_{an}Tr_{BB}\|_F^2$. The least square method is a mathematical optimization technology. In the least square method, an optimal function match for data is found by using a quadratic sum of a minimum error. Unknown data can be easily calculated by using the least square method, so that errors between these data obtained through calculation and actual data have a minimum quadratic sum. The least square method may also be used for curve fitting. Some other optimization problems may also be expressed by using the least square method by minimizing energy or maximizing entropy.

Further, a solution of $Tr_{opt}$ is updated, and it is determined whether an indication variable ii is greater than $N_t^{RF}$. If the indication variable ii is not greater than $N_t^{RF}$, return to step 402 to continue with iteration estimation until the requirement is met, where $$TR_{opt} = \frac{Tr_{opt} - Tr_{an}Tr_{BB}}{\|Tr_{opt} - Tr_{an}Tr_{BB}\|_F}.$$

405: The transmit end fixes $Tr_{BB}$, performs SVD decomposition on $Tr_{an}$, chooses a right singular matrix as $Tr_{IF}$, and chooses a left singular matrix as $Tr_{RF}$.

$Tr_{BB}$ is fixed, and decomposition is performed on $Tr_{an}$ to separately obtain $Tr_{IF}$ and $Tr_{RF}$. In this scheme, SVD decomposition may be performed on $Tr_{an}$, a right singular matrix is chosen as $Tr_{IF}$, and a left singular matrix is chosen as $Tr_{RF}$.

406: The transmit end performs normalization processing to obtain $Tr_{BB}$, $Tr_{IF}$, and $Tr_{RF}$.

Accordingly, the transmit end obtains the transmit-end precoding matrix $Tr_{BB}$, the transmit-end intermediate-frequency beamforming matrix $Tr_{IF}$, and the transmit-end radio-frequency-end beamforming matrix $Tr_{RF}$ according to the feedback information sent by the receive end.

302: The receive end obtains, through calculation, a receive-end precoding matrix $Rx_{BB}$, a receive-end intermediate-frequency beamforming matrix $Rx_{IF}$, and a receive-end radio-frequency-end beamforming matrix $Rx_{RF}$ according to feedback information that is from the transmit end.

Specifically, at the receive end, three processing processes, that is, baseband precoding processing, intermediate-frequency beamforming processing, and radio-frequency beamforming processing are included. During the baseband precoding processing, intermediate-frequency beamforming processing, and radio-frequency beamforming processing, the receive-end precoding matrix $Rx_{BB}$, the receive-end intermediate-frequency beamforming matrix $Rx_{IF}$, and the receive-end radio-frequency-end beamforming matrix $Rx_{RF}$ need to be used to perform weighting processing on a signal. Therefore, the receive end first acquires the channel matrix H, the transmit-end precoding matrix $Tr_{BB}$, the transmit-end intermediate-frequency beamforming matrix $Tr_{IF}$, and the transmit-end radio-frequency-end beamforming matrix $Tr_{RF}$ that are in the feedback information; and the receive end further calculates the angle-of-arrival vector information according to the feedback information and the channel matrix H, and processes the channel matrix H, the angle-of-arrival vector information, $Tr_{BB}$, $Tr_{IF}$, and $Tr_{RF}$ by using a second preset iteration function, to obtain $Rx_{BB}$, $Rx_{IF}$, and $Rx_{RF}$.

Figure 13:
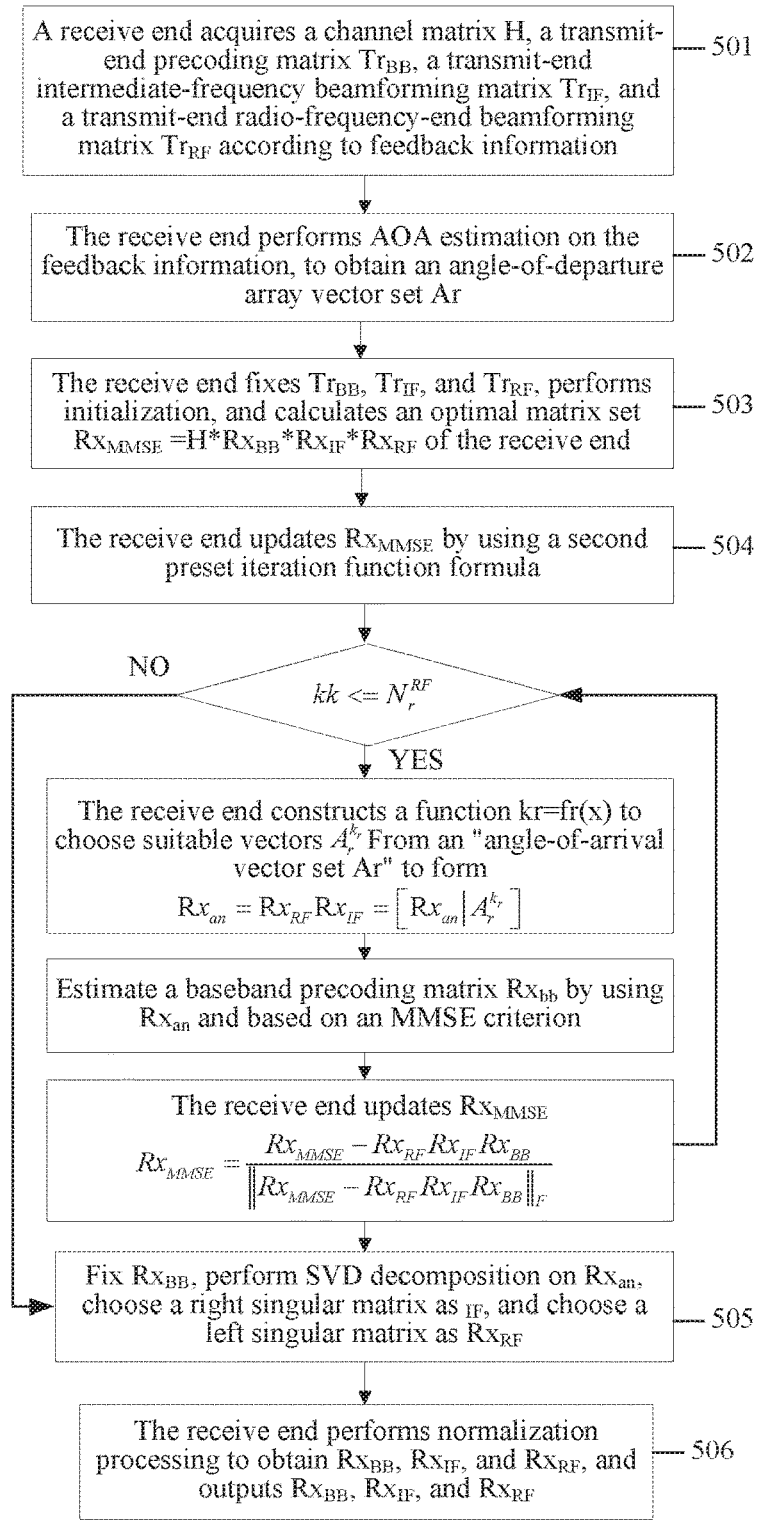
FIG. 13 is a schematic flowchart 5 of a beamforming based communications method according to an embodiment of the present application.

Exemplarily, as shown in FIG. 13, this embodiment of the present application provides a method for constructing a beamforming matrix in a multi-level structure.

501: A receive end acquires a channel matrix H, a transmit-end precoding matrix $Tr_{BB}$, a transmit-end intermediate-frequency beamforming matrix $Tr_{IF}$, and a transmit-end radio-frequency-end beamforming matrix $Tr_{RF}$ according to feedback information.

502: The receive end performs AOA (Angle-of-Arrival,) estimation on the feedback information, to obtain an angle-of-departure array vector set Ar.

AOA estimation is a positioning algorithm based on an angle of arrival of a signal, and is a typical ranging-based positioning algorithm. An angle of arrival of a signal of a transmit node is sensed by using some hardware devices, relative positions or angles of a receiving node and an anchor node are calculated, and a triangulation method or another manner is then used to calculate a position of an unknown node. A positioning algorithm based on AOA of a signal is a common self-positioning algorithm of a wireless sensor network node, and the algorithm has low communication overheads and relatively high positioning precision.

503: The receive end fixes $Tr_{BB}$, $Tr_{IF}$, and $Tr_{BB}$, performs initialization, and calculates an optimal matrix set $Rx_{MMSE}=H*Rx_{BB}*Rx_{IF}*Rx_{RF}$ of the receive end.

In addition, before initialization is performed, a signal $y=H*Tr_{RF}*Tr_{IF}*Tr_{BB}*s(t)+n(t)$ that has passed a channel may be further acquired, where H denotes a channel matrix, s(t) denotes an input single-stream or multi-stream signal, and n(t) denotes Gaussian white noise.

504: The receive end updates $Rx_{MMSE}$ by using a second preset iteration function formula.

Specifically, the receive end first constructs a function $kr=fr(x)$ to choose suitable vectors from an "angle-of-arrival vector set Ar".

First, a cost function $f_r(x)=(A_t)^{H}*E[yy^*]*Rx_{MMSE}$ is constructed, and a cost function $k=\arg \max(f_r(f_r(x)*(f_r(x))^H)$ is used to choose suitable vectors from $A_t$ to form an RF and IF set $Rx_{an}=[Rx_{an}|A_r^k]$.

Further, the receive end estimates a baseband precoding matrix $Rx_{BB}$ by using $Rx_{an}$ and based on an MMSE criterion.

An MMSE (Minimum Mean Square Error) is used to optimize a weighted value coefficient, to obtain optimal spectrum estimation in the sense of a minimum mean square error.

Further, the receive end updates $$Rx_{MMSE} = \frac{Rx_{MMSE} - Rx_{an}Rx_{BB}}{\|Rx_{MMSE} - Rx_{an}Rx_{BB}\|_F}.$$

Specifically, the receive end updates $Rx_{MMSE}$ and determines whether an indication variable kk is greater than $N_r^{RF}$. If the indication variable kk is not greater than $N_r^{RF}$, return to step 503 to continue with iteration estimation until the requirement is met.

505: The receive end fixes $Rx_{BB}$, performs SVD decomposition on $Rx_{an}$, chooses a right singular matrix as $Rx_{IF}$, and chooses a left singular matrix as $Rx_{RF}$.

Specifically, $Rx_{BB}$ is fixed, decomposition is performed on $Rx_{an}$ to separately obtain $Rx_{IF}$ and $Rx_{RF}$. In this scheme, SVD decomposition may be performed on $Rx_{an}$, a right singular matrix is chosen as $Rx_{IF}$, and a left singular matrix is chosen as $Rx_{RF}$.

506: The receive end performs normalization processing to obtain a receive-end precoding matrix $Rx_{BB}$, a receive-end intermediate-frequency beamforming matrix $Rx_{IF}$, and a receive-end radio-frequency-end beamforming matrix $Rx_{RF}$.

It should be noted that, in this embodiment of the present application, $(\bullet)_H$ denotes conjugate transpose, and $\|\bullet\|_F$ denotes a unitarily invariant norm.

Accordingly, the receive end obtains the receive-end precoding matrix $Rx_{BB}$, the receive-end intermediate-frequency beamforming matrix $Rx_{IF}$, and the receive-end radio-frequency-end beamforming matrix $Rx_{RF}$ according to the feedback information sent by a transmit end.

303: The transmit end acquires a first data stream, and performs precoding processing on the first data stream according to $Tr_{BB}$, to generate a first analog signal.

In this embodiment of the present application, the transmit end includes a transmit-end precoding unit, a transmit-end intermediate-frequency beamforming unit, a transmit-end radio-frequency beamforming unit, and a transmit-end feedback unit.

Specifically, the transmit-end precoding unit acquires the first data stream, where the data stream may include Ns information streams, and the transmit-end precoding unit further multiplies the first data stream by $Tr_{BB}$; and the transmit-end precoding unit then performs digital-to-analog conversion processing on the first data stream that is obtained after being multiplied by $Tr_{BB}$, to generate a first analog signal.

Preferably, the transmit-end precoding unit includes a first transceiver, a first processor, and a DAC converter, where the first transceiver is configured to receive the first data stream and send the first data stream to the first processor; the first processor is configured to multiply the first data stream by $Tr_{BB}$; and the DAC converter performs digital-to-analog conversion processing on the first data stream that is obtained after being multiplied by $Tr_{BB}$, to generate the first analog signal.

304: The transmit end performs weighting and power amplification processing on the first analog signal according to $Tr_{IF}$, to generate a second analog signal.

Specifically, after the transmit-end precoding unit generates the first analog signal, the transmit-end intermediate-frequency beamforming unit performs intermediate-frequency-end up-conversion processing on the first analog signal; the transmit-end intermediate-frequency beamforming unit then performs, according to $Tr_{IF}$, weighting processing on the first analog signal that has undergone up-conversion; and the transmit-end intermediate-frequency beamforming unit further performs power amplification processing on the first analog signal that has undergone weighting processing, to generate the second analog signal.

Preferably, the transmit-end intermediate-frequency beamforming unit includes at least one group of a first frequency mixer, a first phase shifter, and a first power amplifier connected in series, where the first frequency mixer is configured to perform, by the transmit end, up-conversion processing on the first analog signal; the first phase shifter is configured to perform, according to $Tr_{IF}$, weighting processing on the first analog signal that has undergone up-conversion; and the first power amplifier is configured to perform power amplification processing on the first analog signal that has undergone weighting processing, to generate the second analog signal.

Further, the performing, by the transmit end according to $Tr_{IF}$, weighting processing on the first analog signal that has undergone up-conversion may include: performing, by the transmit end according to $Tr_{IF}$, amplitude weighting on the first analog signal that has undergone up-conversion; or performing, by the transmit end according to $Tr_{IF}$, phase weighting on the first analog signal that has undergone up-conversion; or performing, by the transmit end according to $Tr_{IF}$, amplitude and phase weighting on the first analog signal that has undergone up-conversion.

305: The transmit end performs weighting and power amplification processing on the second analog signal according to $Tr_{RF}$, to generate a third analog signal.

Specifically, after the transmit-end intermediate-frequency beamforming unit generates the second analog signal, the transmit-end radio-frequency beamforming unit performs radio-frequency-end up-conversion processing on the second analog signal; the transmit-end radio-frequency beamforming unit then performs, according to $Tr_{RF}$, weighting processing on the second analog signal that has undergone up-conversion; and the transmit-end radio-frequency beamforming unit further performs power amplification processing on the second analog signal that has undergone weighting processing, to generate the third analog signal.

Preferably, the transmit-end radio-frequency beamforming unit includes at least one group of a second frequency mixer, a second phase shifter, and a second power amplifier connected in series, where the second frequency mixer is configured to perform up-conversion processing on the second analog signal; the second phase shifter is configured to perform, according to $Tr_{RF}$, weighting processing on the second analog signal that has undergone up-conversion; and the second power amplifier is configured to perform power amplification processing on the second analog signal that has undergone weighting processing, to generate the third analog signal.

306: The transmit end determines an antenna array matching the third analog signal, and transmits the third analog signal to the receive end by using the antenna array matching the third analog signal.

Accordingly, the transmit end sends, to the receive end, the received first data stream that has undergone three processing processes, that is, baseband precoding processing, intermediate-frequency beamforming processing, and radio-frequency beamforming processing, so that precision of a beam direction and a beam width is simultaneously controlled on a basis of reducing complexity of hardware implementation.

307: The receive end acquires the first analog signal, and performs weighting and power amplification processing on the first analog signal according to $Rx_{RF}$, to generate the second analog signal.

In this embodiment of the present application, the receive end includes a receive-end feedback unit, a receive-end radio-frequency beamforming unit, a receive-end intermediate-frequency beamforming unit, and a receive-end precoding unit.

Specifically, the receive-end radio-frequency beamforming unit acquires the first analog signal from the antenna array, and further performs weighting processing on the first analog signal according to $Rx_{RF}$; the receive-end radio-frequency beamforming unit then performs power amplification processing on the first analog signal that has undergone weighting processing; and the receive-end radio-frequency beamforming unit finally performs radio-frequency-end down-conversion processing on the first analog signal that has undergone power amplification processing, to generate the second analog signal.

Preferably, the receive-end radio-frequency beamforming unit includes at least one group of a third phase shifter, a third power amplifier, and a third frequency mixer connected in series, where the third phase shifter is configured to perform weighting processing on the first analog signal according to $Rx_{RF}$; the third power amplifier is configured to perform power amplification processing on the first analog signal that has undergone weighting processing; and the third frequency mixer is configured to perform radio-frequency-end down-conversion processing on the first analog signal that has undergone power amplification processing, to generate the second analog signal.

308: The receive end performs weighting and power amplification processing on the second analog signal according to $Rx_{IF}$, to generate the third analog signal.

Specifically, after the receive-end radio-frequency beamforming unit generates the second analog signal, the receive-end intermediate-frequency beamforming unit performs weighting processing on the second analog signal according to $Rx_{IF}$; the receive-end intermediate-frequency beamforming unit further performs power amplification processing on the second analog signal that has undergone weighting processing; and the receive-end intermediate-frequency beamforming unit finally performs intermediate-frequency-end down-conversion processing on the second analog signal that has undergone power amplification processing, to generate the third analog signal.

Further, the performing, by the receive-end intermediate-frequency beamforming unit, weighting processing on the second analog signal according to $Rx_{IF}$ may include: performing, by the receive end, amplitude weighting on the second analog signal according to $Rx_{IF}$; or performing, by the receive end, phase weighting on the second analog signal according to $Rx_{IF}$; or performing, by the receive end, amplitude and phase weighting on the second analog signal according to $Rx_{IF}$.

Preferably, the receive-end intermediate-frequency beamforming unit includes at least one group of a fourth phase shifter, a fourth power amplifier, and a fourth frequency mixer connected in series, where the fourth phase shifter is configured to perform weighting processing on the second analog signal according to $Rx_{IF}$; the fourth power amplifier is configured to perform power amplification processing on the second analog signal that has undergone weighting processing; and the fourth frequency mixer is configured to perform down-conversion processing on the second analog signal that has undergone power amplification processing, to generate the third analog signal.

309: The receive end performs encoding processing on the third analog signal according to $Rx_{BB}$, to generate a second data stream.

Specifically, after the receive-end intermediate-frequency beamforming unit generates the third analog signal, the receive-end precoding unit converts the third analog signal into a digital signal; and the receive-end precoding unit further performs, according to $Rx_{BB}$, weighting processing on the third analog signal converted into the digital signal, to obtain the second data stream, where the second data stream is used to perform layer demapping.

Preferably, the receive-end precoding unit includes a second DAC converter and a third processor, where the second DAC converter is configured to convert the third analog signal into a digital signal; and the third processor is configured to perform, according to $Rx_{BB}$, weighting processing on the third analog signal converted into the digital signal, to obtain the second data stream.

Accordingly, the receive end sends, to the transmit end, the received first data stream that has undergone three processing processes, that is, radio-frequency beamforming processing, intermediate-frequency beamforming processing, and baseband precoding processing. Compared with the prior art, this solution can bring beneficial effects in multiple aspects: First, a quantity of ADCs/DACs required in beam control using a three-level structure is reduced. It is assumed that beam control is implemented in two cases. In case 1, three-level beam control is used, and in case 2, two-level beam control is used. It is assumed that radio-frequency beamforming matrices corresponding to the two cases have same dimensionality. In case 1, a relatively small precoding matrix is used in a baseband part, and weighting processing is performed on a signal in an intermediate-frequency part, so that dimensionality of an array may be further increased. In case 2, a baseband precoding matrix is directly used for processing. As known from comparison, a quantity of ADCs/DACs required in case 1 is less than that in case 2. Second, for each channel, a required gain can be conveniently adjusted according to a complexity requirement. As can be seen from the foregoing method, for each data stream, adjustment of a gain can be flexibly implemented through IF processing and RF processing, and herein, can be implemented by adjusting a quantity of IF output ports. Third, an error in a beam direction is smaller; in addition, when three-level beam control is used, a difference from two-level beam control is that one more level of beam control is added at an intermediate frequency end, and one of the following forms can be selected for a weighting manner:

(1) amplitude weighting and phase weighting;
(2) amplitude weighting; and
(3) phase weighting.

As known from comparison, a three-level beam control system obtains a more accurate beam direction and has a smaller error. Fourth, in this solution, a quantity of levels may be selected according to an actual requirement of a user; and a switch of each level is controlled according to an actual requirement of the user, and level 1/level 2/level 3 may be separately selected to control a beam direction.

According to the beamforming based communications method provided in this embodiment of the present application, a beam direction and a beam width can be simultaneously controlled, by using a multi-beam system having a three-level structure, on a basis of reducing complexity of hardware implementation, so that not only a quantity of ADCs/DACs required for beam control is reduced, but also adjustment of a gain can be implemented by adjusting quantities of intermediate-frequency ports and radio-frequency ports.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A transmit end comprising:
a processor; and
a non-transitory computer readable storage medium storing programming for execution by the processor, the programming including instructions to:
obtain a transmit-end precoding matrix $Tr_{BB}$, a transmit-end intermediate-frequency beamforming matrix $Tr_{IF}$, and a transmit-end radio-frequency-end beamforming matrix $Tr_{RF}$, according to feedback information from a receive end, wherein the feedback information comprises a channel matrix H and angle-of-departure (AOD) vector information;

acquire a first data stream;

perform precoding processing on the first data stream according to $Tr_{BB}$, to generate a first analog signal, wherein the first data stream is generated after a bitstream for transmission is scrambled and undergoes layer mapping;

perform weighting and power amplification processing on the first analog signal according to $Tr_{IF}$, to generate a second analog signal;

perform weighting and power amplification processing on the second analog signal according to $Tr_{RF}$, to generate a third analog signal;

determine an antenna array matching the third analog signal; and transmit, to the receive end, the third analog signal, using the antenna array matching the third analog signal.

2. The transmit end according to claim 1, wherein the instructions further comprise instructions to:

perform precoding on the first data stream according to $Tr_{BB}$, to obtain a precoding signal; and perform digital-to-analog conversion processing on the precoding signal, to generate the first analog signal.

3. The transmit end according to claim 1, wherein the instructions further comprise instructions to:

perform intermediate-frequency-end up-conversion processing on the first analog signal to produce an up-converted analog signal;

perform, according to $Tr_{IF}$, weighting processing on the up-converted analog signal to produce a processed analog signal; and perform power amplification processing on the processed analog signal.

4. The transmit end according to claim 1, wherein the instructions further comprise instructions to:

perform radio-frequency-end up-conversion processing on the second analog signal to produce an up-converted analog signal;

perform, according to $Tr_{RF}$, weighting processing on the up-converted analog signal to produce a processed analog signal; and perform power amplification processing on the processed analog signal.

5. The transmit end according to claim 1, wherein the instructions further comprise instructions to:

perform up-conversion on the first analog signal; and perform, according to $Tr_{IF}$, weighting processing on the first analog signal after performing up-conversion on the first analog signal, wherein the instructions to perform weighting processing comprise instructions to perform one of amplitude weighting and phase weighting, amplitude weighting, and phase weighting.

6. The transmit end according to claim 1, wherein the instructions further comprise instructions to:

acquire the channel matrix H and the AOD vector information according to the feedback information; and process the channel matrix H and the AOD vector information using a first preset iteration function, to obtain $Tr_{BB}$, $Tr_{IF}$, and $Tr_{RF}$.

7. A receive end comprising:

a processor; and a non-transitory computer readable storage medium storing programming for execution by the processor, the programming including instructions to:

obtain a receive-end precoding matrix $Rx_{BB}$, a receive-end intermediate-frequency beamforming matrix $Rx_{IF}$, and a receive-end radio-frequency-end beamforming matrix $Rx_{RF}$, according to feedback information from a transmit end, wherein the feedback information comprises a channel matrix H, angle-of-arrival (AOA) vector information, a transmit-end precoding matrix $Tr_{BB}$, a transmit-end intermediate-frequency beamforming matrix $Tr_{IF}$, and a transmit-end radio-frequency-end beamforming matrix $Tr_{RF}$;

acquire a first analog signal;

perform weighting and power amplification processing on the first analog signal according to $Rx_{RF}$, to generate a second analog signal;

perform weighting and power amplification processing on the second analog signal according to $Rx_{IF}$, to generate a third analog signal; and perform encoding processing on the third analog signal according to $Rx_{BB}$, to generate a second data stream, wherein the second data stream is used to perform layer demapping.

8. The receive end according to claim 7, wherein the instructions further comprise instructions to:

perform weighting processing on the first analog signal according to $Rx_{RF}$ to produce a processed analog signal;

perform power amplification processing on the processed analog signal to produce an amplified analog signal; and perform radio-frequency-end down-conversion processing on the amplified analog signal.

9. The receive end according to claim 7, wherein the instructions further comprise instructions to:

perform weighting processing on the second analog signal according to $Rx_{IF}$ to produce a processed analog signal;

perform power amplification processing on the processed analog signal to produce an amplified analog signal; and perform intermediate-frequency-end down-conversion processing on the amplified analog signal, to generate the third analog signal.

10. The receive end according to claim 7, wherein instructions further comprise instructions to:

convert the third analog signal to a digital signal; and perform, according to $Rx_{BB}$, weighting processing on the digital signal, to obtain the second data stream.

11. The receive end according to claim 7, wherein the instructions further comprise instructions to:

perform weighting processing on the second analog signal according to $Rx_{IF}$, wherein the instructions to perform weighting processing comprise instructions for one of amplitude weighting and phase weighting, amplitude weighting, and phase weighting.

12. The receive end according to claim 7, wherein the instructions further comprise instructions to:

acquire the channel matrix H, the AOA vector information, $Tr_{BB}$, $Tr_{IF}$, and $Tr_{RF}$ that are in the feedback information; and process the channel matrix H, the AOA vector information, $Tr_{BB}$, $Tr_{IF}$, and $Tr_{RF}$ by using a second preset iteration function, to obtain $Rx_{BB}$, $Rx_{IF}$, and $Rx_{RF}$.

13. A method, comprising:

obtaining, by a transmit end, a transmit-end precoding matrix $Tr_{BB}$, a transmit-end intermediate-frequency beamforming matrix $Tr_{IF}$, and a transmit-end radio-frequency-end beamforming matrix $Tr_{RF}$, according to feedback information that is from a receive end, wherein the feedback information comprises a channel matrix H and angle-of-departure (AOD) vector information;

acquiring, by the transmit end, a first data stream;

performing precoding processing on the first data stream according to $Tr_{BB}$, to generate a first analog signal, wherein the first data stream is generated after a bitstream for transmission is scrambled and undergoes layer mapping;

performing weighting and power amplification processing on the first analog signal according to $Tr_{IF}$, to generate a second analog signal;

performing weighting and power amplification processing on the second analog signal according to $Tr_{RF}$, to generate a third analog signal;

determining an antenna array matching the third analog signal; and transmitting the third analog signal to the receive end using the antenna array matching the third analog signal.

14. The method according to claim 13, wherein performing precoding processing on the first data stream according to $Tr_{BB}$, to generate the first analog signal comprises:

performing precoding on the first data stream according to $Tr_{BB}$, to obtain a precoding signal; and performing digital-to-analog conversion processing on the precoding signal, to generate the first analog signal.

15. The method according to claim 13, wherein performing weighting and power amplification processing on the first analog signal according to $Tr_{IF}$, to generate the second analog signal comprises:

performing intermediate-frequency-end up-conversion processing on the first analog signal to produce an up-converted analog signal;

performing, according to $Tr_{IF}$, weighting processing on the up-converted analog signal to produce a processed analog signal; and performing, by the transmit end, power amplification processing on the processed analog signal, to generate the second analog signal.

16. The method according to claim 13, wherein performing weighting and power amplification processing on the second analog signal according to $Tr_{RF}$, to generate the third analog signal comprises:

performing radio-frequency-end up-conversion processing on the second analog signal to produce an up-converted analog signal;

performing, according to $Tr_{BB}$, weighting processing on the up-converted analog signal to produce a processed analog signal; and performing, by the transmit end, power amplification processing on the processed analog signal, to generate the third analog signal.

17. The method according to claim 13, further comprising:

performing up-conversion on the first analog signal to produce an up-converted analog signal; and performing, according to $Tr_{IF}$, weighting processing on the up-converted analog signal, wherein performing weighting processing comprises performing one of amplitude weighting and phase weighting, amplitude weighting, and phase weighting.

18. The method according to claim 13, wherein obtaining, by the transmit end, the transmit-end precoding matrix $Tr_{BB}$, the transmit-end intermediate-frequency beamforming matrix $Tr_{IF}$, and the transmit-end radio-frequency-end beamforming matrix $Tr_{RF}$ according to the feedback information from the receive end comprises:

acquiring, by the transmit end, the channel matrix H and the AOD vector information, according to the feedback information; and processing the channel matrix H and the AOD vector information using a first preset iteration function, to obtain $Tr_{BB}$, $Tr_{IF}$, and $Tr_{RF}$.

19. A method comprising:

obtaining, by a receive end, a receive-end precoding matrix $Rx_{BB}$, a receive-end intermediate-frequency beamforming matrix $Rx_{IF}$, and a receive-end radio-frequency-end beamforming matrix $Rx_{RF}$, according to feedback information from a transmit end, wherein the feedback information comprises a channel matrix H, angle-of-arrival (AOA) vector information, a transmit-end precoding matrix $Tr_{BB}$, a transmit-end intermediate-frequency beamforming matrix $Tr_{IF}$, and a transmit-end radio-frequency-end beamforming matrix $Tr_{RF}$;

acquiring, by the receive end, a first analog signal;

performing weighting and power amplification processing on the first analog signal according to $Rx_{RF}$, to generate a second analog signal;

performing weighting and power amplification processing on the second analog signal according to $Rx_{IF}$, to generate a third analog signal; and performing encoding processing on the third analog signal according to $Rx_{BB}$, to generate a second data stream, wherein the second data stream is used to perform layer demapping.

20. The method according to claim 19, wherein performing weighting and power amplification processing on the first analog signal according to $Rx_{RF}$, to generate the second analog signal comprises:

performing weighting processing on the first analog signal according to $Rx_{RF}$ to produce a processed analog signal;

performing, by the receive end, power amplification processing on the processed analog signal to produce an amplified analog signal; and performing, by the receive end, radio-frequency-end down-conversion processing on the amplified analog signal, to generate the second analog signal.

21. The method according to claim 19, wherein performing weighting and power amplification processing on the second analog signal according to $Rx_{IF}$, to generate the third analog signal comprises:

performing weighting processing on the second analog signal according to $Rx_{IF}$ to produce a processed analog signal;

performing power amplification processing on the processed analog signal to produce an amplified analog signal; and performing, by the receive end, intermediate-frequency-end down-conversion processing on the amplified analog signal, to generate the third analog signal.

22. The method according to claim 19, wherein performing encoding processing on the third analog signal according to $Rx_{BB}$, to generate the second data stream comprises:

converting the third analog signal into a digital signal; and performing, according to $Rx_{BB}$, weighting processing on the digital signal, to obtain the second data stream.

23. The method according to claim 19, further comprising performing weighting processing on the second analog signal according to $Rx_{IF}$, wherein performing weighting processing on the second analog signal comprises one of amplitude weighting and phase weighting, amplitude weighting, and phase weighting.

24. The method according to claim 19, wherein obtaining the receive-end precoding matrix $Rx_{BB}$, the receive-end intermediate-frequency beamforming matrix $Rx_{IF}$, and the receive-end radio-frequency-end beamforming matrix $Rx_{RF}$ according to feedback information from the transmit end comprises:

acquiring, by the receive end, the channel matrix H, the angle-of-arrival vector information, $Tr_{BB}$, $Tr_{IF}$, and $Tr_{RF}$ that are in the feedback information; and processing the channel matrix H, the angle-of-arrival vector information, $Tr_{BB}$, $Tr_{IF}$, and $Tr_{RF}$ by using a second preset iteration function, to obtain $Rx_{BB}$, $Rx_{IF}$, and $Rx_{RF}$.

\* \* \* \* \*